(12) United States Patent
Yamanaka et al.

(10) Patent No.: US 10,040,457 B2
(45) Date of Patent: Aug. 7, 2018

(54) DRIVING FORCE CONTROL SYSTEM FOR VEHICLE

(71) Applicant: TOYOTA JIDOSHA KABUSHIKI KAISHA, Toyota-shi, Aichi-ken (JP)

(72) Inventors: Satoshi Yamanaka, Susono (JP); Seiji Kuwahara, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 75 days.

(21) Appl. No.: 15/069,139

(22) Filed: Mar. 14, 2016

(65) Prior Publication Data
US 2016/0272213 A1  Sep. 22, 2016

(30) Foreign Application Priority Data

Mar. 17, 2015 (JP) .................................. 2015-052929
Sep. 29, 2015 (JP) .................................. 2015-190815

(51) Int. Cl.
| | |
|---|---|
| *B60W 30/19* | (2012.01) |
| *F16H 61/12* | (2010.01) |
| *B60W 50/10* | (2012.01) |
| *B60W 30/188* | (2012.01) |
| *F16H 61/00* | (2006.01) |
| *F16H 61/02* | (2006.01) |

(52) U.S. Cl.
CPC ........ *B60W 30/19* (2013.01); *B60W 30/1882* (2013.01); *B60W 50/10* (2013.01);
(Continued)

(58) Field of Classification Search
CPC .... B60W 10/06; B60W 10/10; B60W 10/115; B60W 30/18109; B60W 30/18072;
(Continued)

(56) References Cited

U.S. PATENT DOCUMENTS 8,313,414 B2* 11/2012 Kuwahara ........... F16H 61/0213
477/101
8,571,773 B2* 10/2013 Roth ..................... B60W 10/11
477/107
(Continued)

FOREIGN PATENT DOCUMENTS

EP          1195303 A2 *  4/2002   ............ B60T 8/1755
JP       2002-139135 A    5/2002
(Continued)

*Primary Examiner* — Ramya P Burgess
*Assistant Examiner* — David R Morris
(74) *Attorney, Agent, or Firm* — Hunton Andrews Kurth LLP

(57) ABSTRACT

A driving force control system of a vehicle installed with an automatic transmission that transmits torque generated by an engine to drive wheels while changing the speed is provided for controlling driving force based on the vehicle speed and the accelerator operation amount. In the driving force control, an acceleration characteristic that defines the relationship between re-acceleration-time acceleration as a control index used when the vehicle travels while being re-accelerated after deceleration traveling, and the vehicle speed, is stored, and the re-acceleration-time acceleration corresponding to the current vehicle speed is obtained, based on traveling data of the vehicle obtained before the deceleration traveling, and the acceleration characteristic. Then, the speed ratio of the automatic transmission which can realize the obtained re-acceleration-time acceleration is set, before the re-acceleration traveling is started.

4 Claims, 22 Drawing Sheets

(52) U.S. Cl.
CPC ..... *B60W 2520/10* (2013.01); *B60W 2540/10* (2013.01); *F16H 2061/0012* (2013.01); *F16H 2061/0244* (2013.01)

(58) Field of Classification Search
CPC ....... B60W 30/18145; B60W 2520/10; B60W 2520/105; B60W 2540/10; B60W 2710/1005
See application file for complete search history.

(56) References Cited

U.S. PATENT DOCUMENTS

| | | | | |
|---|---|---|---|---|
| 8,903,619 | B2* | 12/2014 | Noumura | B60W 30/02 180/197 |
| 9,067,604 | B2* | 6/2015 | Noumura | B60W 10/06 |
| 2003/0093210 | A1 | 5/2003 | Kondo et al. | |
| 2010/0332092 | A1 | 12/2010 | Yamada et al. | |
| 2011/0313631 | A1* | 12/2011 | Roth | F16H 61/0213 701/60 |
| 2012/0179342 | A1* | 7/2012 | Noumura | B60W 10/06 701/54 |
| 2012/0221228 | A1* | 8/2012 | Noumura | B60W 40/09 701/110 |

FOREIGN PATENT DOCUMENTS

| | | |
|---|---|---|
| JP | 2003-211999 A | 7/2003 |
| JP | 2007-139090 A | 6/2007 |
| JP | 2007-170444 A | 7/2007 |
| KR | 20100136496 A | 12/2010 |

* cited by examiner

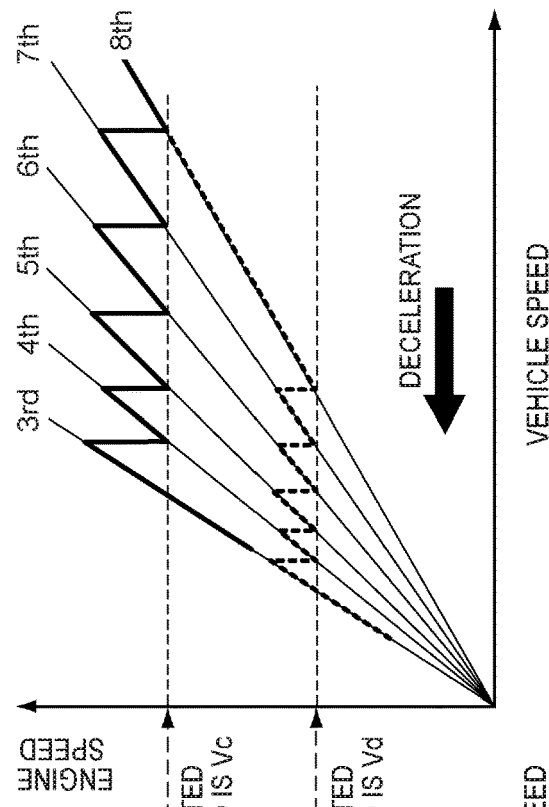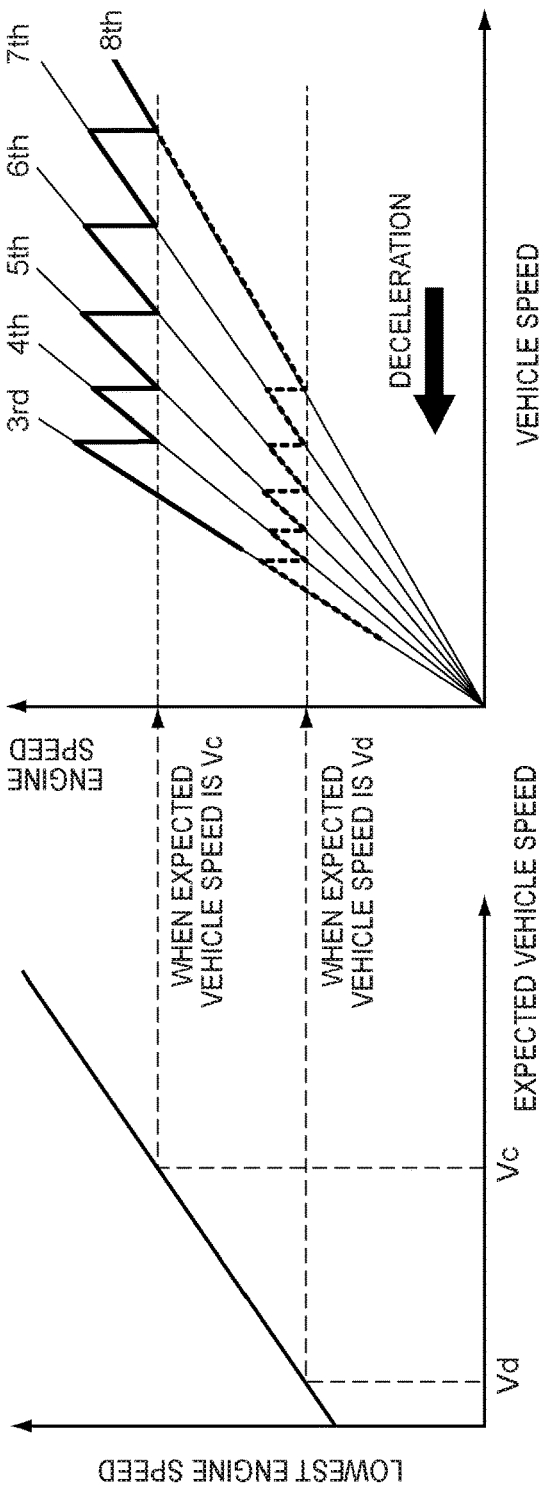

DRIVING FORCE CONTROL SYSTEM FOR VEHICLE

INCORPORATION BY REFERENCE

The disclosure of Japanese Patent Applications Nos. 2015-052929 and 2015-190815 filed on Mar. 17, 2015 and Sep. 29, 2015 including the specifications, drawings and abstracts is incorporated herein by reference in its entirety.

BACKGROUND OF THE INVENTION

1. Field of the Invention

The invention relates to a driving force control system for a vehicle, which controls driving force of the vehicle by changing the speed ratio of an automatic transmission, while the vehicle is traveling while being decelerated.

2. Description of Related Art

In Japanese Patent Application Publication No. 2007-170444 (JP 2007-170444 A), a driving force control system for a vehicle is described which performs control for inhibiting upshift when the accelerator pedal of the vehicle is rapidly released, and performs deceleration assist control including control for performing downshift when a brake is suddenly applied to the vehicle. The driving force control system described in JP 2007-170444 A identified above is configured to determine conditions of the deceleration assist control as described above, based on a traveling environment and traveling conditions of the vehicle. For example, the system determines whether the deceleration assist control is to be performed, and a control level used when the deceleration assist control is performed, according to a distance between the own vehicle and a vehicle in front, a road surface gradient, and/or the driving tendency of the driver, for example. In a control example described in JP 2007-170444 A identified above, when the driving tendency of the driver is sporty traveling tendency, the automatic transmission can be shifted down to a lower gear position during execution of the deceleration assist control. The sporty traveling tendency is a driving tendency with which a greater value or emphasis is placed on the power performance of the vehicle, and a quick response of the vehicle to driving operation is required.

In Japanese Patent Application Publication No. 2003-211999 (JP 2003-211999 A), a traveling control system that lets the own vehicle to automatically follow a leading vehicle is described. In the traveling control system described in JP 2003-211999 A, traveling data indicating the behavior of the vehicle, traveling environment, driving operation, etc. is sampled, during traveling of the vehicle operated by the driver, and the driving tendency of the driver (multiple regression coefficient) is obtained by making a multiple regression analysis on the traveling data. Then, the system is configured to let the own vehicle automatically follow the leading vehicle, by setting a target acceleration/deceleration based on the driving tendency.

Also, a driving force control system described in Japanese Patent Application Publication No. 2002-139135 (JP 2002-139135 A) is configured to calculate a recommended speed ratio based on traveling environment of a road, calculate the optimum speed ratio, based on the recommended speed ratio, driver's intention to change the speed ratio, and the actual speed ratio, and change the optimum speed ratio at a rate of change determined by a difference between the recommended speed ratio and the actual speed ratio.

As described above, in the control system described in JP 2007-170444 A, the driving tendency of the driver is estimated during traveling of the vehicle. Then, when the driving tendency is the sporty driving tendency, the automatic transmission is shifted down to a lower gear position, as compared with the case where the driving tendency is not the sporty driving tendency, when the vehicle is decelerated ahead of a corner or an intersection, for example. With the downshift thus performed during deceleration, the acceleration performance can be improved when the vehicle is re-accelerated after being braked.

In the meantime, the control system described in JP 2007-170444 A uniformly sets the gear position during deceleration at a point ahead of a corner or an intersection, depending on whether the driving tendency of the driver is the sporty driving tendency, and performs downshift to establish the thus set gear position. Also, the driving tendency, which is an estimated value, inevitably includes individual differences or estimation errors. Therefore, the gear position or speed ratio established after the downshift may not be adequate or appropriate. For example, if the downshift is not sufficient, further downshift may be performed when the driver depresses the accelerator pedal so as to accelerate the vehicle after turning the corner. Namely, the driving force actually generated may be insufficient, relative to the required driving force intended by the driver. As a result, the driver may feel strange or uncomfortable, or may feel that the acceleration performance or acceleration feeling is not good.

SUMMARY OF THE INVENTION

This invention was conceived in view of the above-described technical problems, and provides a driving force control system for use in a vehicle on which an automatic transmission is installed, which system sets an appropriate gear position (speed ratio) that reflects the driver's intention and driving tendency, for re-acceleration traveling of the vehicle, in a situation where the vehicle is re-accelerated after being decelerated.

According to one aspect of the invention, a driving force control system for a vehicle including an engine, drive wheels, and an automatic transmission that transmits torque between the engine and the drive wheels is provided. The driving force control system includes a controller. The controller is configured to: (i) control driving force of the vehicle, based on a vehicle speed and an accelerator operation amount of the vehicle, (ii) store an acceleration characteristic that defines a relationship between re-acceleration-time acceleration and the vehicle speed, the re-acceleration-time acceleration being as a control index used when the vehicle travels while being re-accelerated after deceleration traveling, (iii) obtain the re-acceleration-time acceleration corresponding to a current vehicle speed, based on traveling data of the vehicle obtained before the deceleration traveling, and the acceleration characteristic, and (iv) set a speed ratio of the automatic transmission which can realize the re-acceleration-time acceleration, based on the obtained re-acceleration-time acceleration, before the re-acceleration traveling is started.

In the driving force control system as described above, the controller may be configured to: (i) estimate an expected vehicle speed desired by a driver to be achieved during the re-acceleration traveling, based on the traveling data obtained during acceleration traveling before the deceleration traveling, and (ii) obtain the re-acceleration-time acceleration corresponding to the current vehicle speed, based on the current vehicle speed and the expected vehicle speed estimated.

In the driving force control system as described above, the controller may be configured to: (i) store a plurality of acceleration characteristic lines on which the re-acceleration-time acceleration is determined according to the vehicle speed, (ii) select one of the acceleration characteristic lines based on the expected vehicle speed, and (iii) obtain the re-acceleration-time acceleration corresponding to the current vehicle speed, based on the current vehicle speed, the expected vehicle speed, and the selected one of the acceleration characteristic lines.

In the driving force control system as described above, the controller may be configured to: (i) store a vehicle speed and an acceleration when the re-acceleration traveling is started, and (ii) update the acceleration characteristic line.

In the driving force control system as described above, the controller may be configured to: (i) obtain the re-acceleration-time acceleration, by using an average value of the re-acceleration-time acceleration or an average value of the expected vehicle speed in re-acceleration travels performed a plurality of times in the past, and (ii) set the speed ratio of the automatic transmission that can realize the obtained re-acceleration-time acceleration.

In the driving force control system as described above, the controller may be configured to set a highest vehicle speed recorded by the vehicle from a point in time when the expected vehicle speed is not set, before the deceleration traveling is started, as the expected vehicle speed.

In the driving force control system for the vehicle according to the invention, when the vehicle is re-accelerated after being decelerated, the speed ratio (or gear position) of the automatic transmission which enables the vehicle to be accelerated at the above-indicated re-acceleration-time acceleration, namely, the acceleration expected by the driver, is set by the time when the re-acceleration traveling is started. The re-acceleration-time acceleration is a control index for use during re-acceleration traveling after deceleration traveling, and is an estimated value of an acceleration desired by the driver to be achieved during re-acceleration traveling, or an acceleration expected by the driver. The re-acceleration-time acceleration is obtained based on an acceleration characteristic stored in advance, and traveling data of the vehicle obtained before deceleration traveling. The acceleration characteristic, which defines the relationship between the re-acceleration-time acceleration and the vehicle speed, may be stored in advance. The traveling data of the vehicle may include physical quantities, such as the vehicle speed, acceleration, speed ratio of the automatic transmission, and the engine speed, which represent traveling conditions of the vehicle.

Accordingly, with the driving force control system for the vehicle of this invention, when the vehicle is re-accelerated after being decelerated, shift control of the automatic transmission for setting the speed ratio that enables the vehicle to be accelerated at the re-acceleration-time acceleration can be completed before the re-acceleration traveling is started. Also, the re-acceleration-time acceleration is obtained as described above from the traveling data obtained before deceleration traveling and the acceleration characteristic of the vehicle; therefore, the re-acceleration-time acceleration can be used as a control index of shift control which reflects the driver's intention, driving tendency, and so forth. Therefore, at the time when re-acceleration traveling is started after deceleration traveling, the speed ratio that can provide driving force necessary for re-acceleration has been already set in the automatic transmission. Also, the speed ratio set at this time is presumed to permit the vehicle to be accelerated at the acceleration intended by the driver, or the acceleration requested by the driver.

For example, when the vehicle turns a corner, the automatic transmission may be shifted down in advance to the speed ratio (gear position) suitable for re-acceleration traveling of the vehicle in a stage where the vehicle leaves the corner, or to the re-acceleration-time acceleration, during deceleration traveling of the vehicle from a stage where the vehicle enters the corner to a stage where the vehicle is traveling while turning the corner. Accordingly, when the vehicle enters a corner and turns the corner, the vehicle can be appropriately decelerated so as to perform a stable turning travel, while keeping a condition where large driving force can be obtained. Then, when the vehicle leaves the corner and starts being re-accelerated, the automatic transmission has been shifted down to a condition where large driving force can be obtained.

Thus, according to the driving force control system for the vehicle of this invention, further downshift is prevented from being performed at the time of re-acceleration traveling after deceleration traveling, so as to make up for a shortage of driving force due to insufficient downshift during deceleration traveling, and the vehicle can be appropriately accelerated. Therefore, the driver is less likely or unlikely to feel strange or uncomfortable or feel shock, and the acceleration performance of the vehicle and acceleration feeling can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 11A and FIG. 11B are views useful for explaining a further control example when the driving force control of the invention is performed;

DETAILED DESCRIPTION OF EMBODIMENTS

Next, one embodiment of the invention will be described with reference to the drawings. A vehicle to which this invention can be applied is installed with an automatic transmission capable of transmitting power generated by an engine to drive wheels while changing the speed. The automatic transmission of the vehicle to which the invention is applied may be a continuously variable transmission, such as a belt-type CVT or a toroidal CVT, which is able to continuously change the speed ratio. This invention may also be applied to a hybrid vehicle including a power split device that combines and splits power generated by an engine and a motor. Namely, the power split device included in the hybrid vehicle functions as a so-called electric continuously variable transmission, and the electric continuously variable transmission may be regarded as one type of automatic transmission according to this invention.

Figure 1:
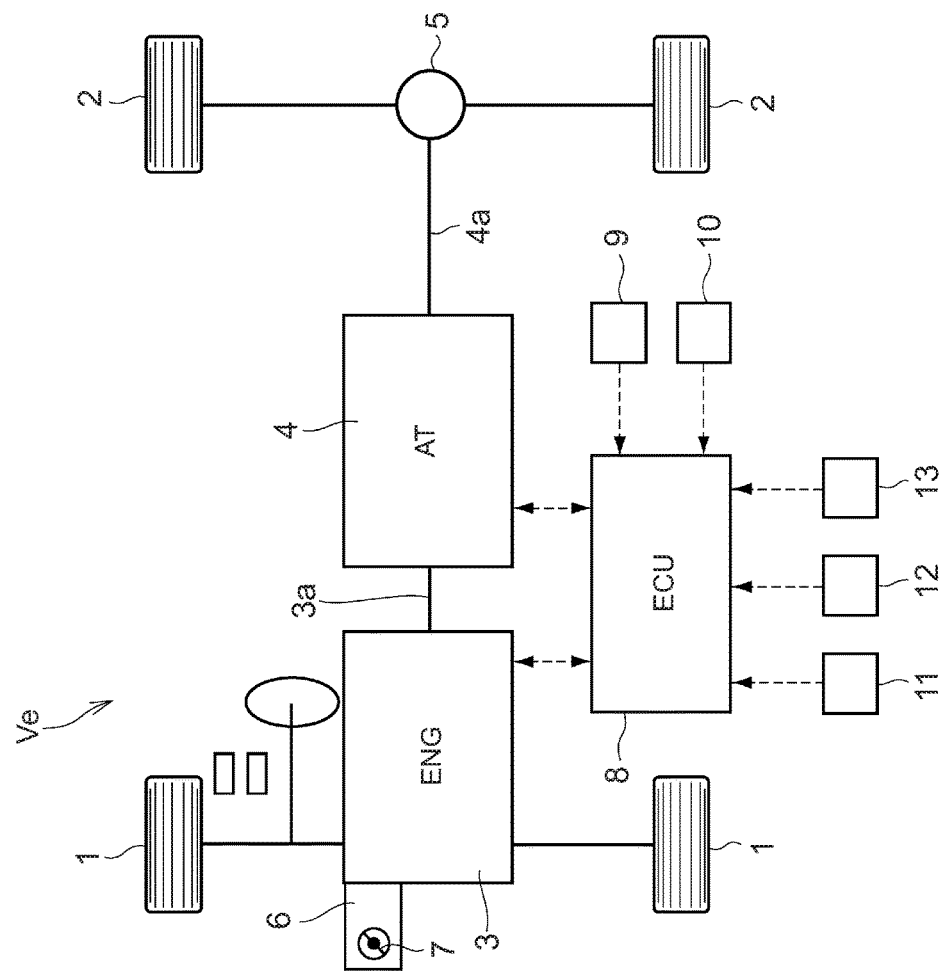
FIG. 1 is a view showing one example of the configuration of a vehicle that is to be controlled by a driving force control system for a vehicle according to this invention, and a control system.

As one example of vehicle to which this invention can be applied, the configuration of a vehicle on which an automatic transmission is installed on the output side of an engine, and its control system, are illustrated in FIG. 1. The vehicle Ve shown in FIG. 1 has front wheels 1 and rear wheels 2. In the example shown in FIG. 1, the vehicle Ve is configured as a rear-wheel-drive vehicle in which power generated by an engine (ENG) 3 is transmitted to the rear wheels 2 via an automatic transmission (AT) 4 and a differential gear set 5, so as to produce driving force. The vehicle Ve to which this invention can be applied may be a front-wheel-drive vehicle in which power generated by the engine 3 is transmitted to the front wheels 1 so as to produce driving force. The vehicle Ve may also be a four-wheel-drive vehicle in which power generated by the engine 3 is transmitted to the front wheels 1 and the rear wheels 2, so as to produce driving force.

The engine 3 includes an electronically controlled throttle valve or electronically controlled fuel injection devices, for example, and an airflow sensor that detects the flow rate of intake air. In the example shown in FIG. 1, the engine 3 includes an electronic throttle valve 6 and an airflow sensor 7. Accordingly, it is possible to automatically control the output of the engine 3, by electrically controlling operation of the electronic throttle valve 6, based on detected data of an accelerator pedal position sensor 9 which will be described later, for example.

The automatic transmission 4 is provided on the output side of the engine 3, for transmitting output torque of the engine 3 toward the drive wheels while changing the speed. The automatic transmission 4 is a conventional automatic transmission having two or more gear positions and consisting of a planetary gear train and clutch and brake mechanisms. By controlling operation of the clutch mechanism and brake mechanism, the gear position (or speed ratio) to be established or set in the automatic transmission 4 can be automatically controlled.

A controller 8 is provided for controlling the output of the engine 3 and gear shifting of the automatic transmission 4. The controller 8 is an electronic control unit (ECU) constituted mainly by a microcomputer, for example. The engine 3 is connected to the controller 8 such that they can communicate with each other for control of the engine 3. Also, the automatic transmission 4 is connected to the controller 8 via a hydraulic control system (not shown) such that they can communicate with each other for control of the transmission 4. While one controller 8 is provided in the example of FIG. 1, two or more controllers may be provided for respective devices or instruments, or may be provided for respective control contents, for example.

The above-described controller 8 is configured to receive detection signals from various sensors in respective parts of the vehicle Ve, and information signals from various vehicle-mounted devices. For example, the controller 8 is configured to receive detection signals from the above-mentioned airflow sensor 7, accelerator pedal position sensor 9 that detects the accelerator operation amount or pedal position, a brake sensor (or brake switch) 10 that detects the amount of depression of a brake pedal, an engine speed sensor 11 that detects the rotational speed of an output shaft 3a of the engine 3, an output shaft speed sensor 12 that detects the rotational speed of an output shaft 4a of the automatic transmission 4, and a vehicle speed sensor 13 that obtains the vehicle speed by detecting the rotational speeds of the respective wheels 1, 2. Then, the controller 8 is configured to perform computations using the received data, data stored in advance, etc., and output control command signals based on the results of computations.

When the vehicle Ve configured as described above is re-accelerated after being decelerated, a downshift may be performed in response to the driver's depression of the accelerator pedal, as described above. If the automatic transmission 4 is not appropriately shifted down during deceleration, driving force becomes insufficient at the time of re-acceleration, and a downshift for establishing the further lower gear position (or increasing the speed ratio) would be performed when the vehicle Ve starts being re-accelerated. As a result, the driver may feel strange or uncomfortable, or may not get good acceleration feeling. Also, the intention and driving tendency of the driver change depending on individual differences among drivers, traveling environment, and so forth. Nonetheless, if the automatic transmission 4 is uniformly shifted down during deceleration as described above, the driving force and acceleration intended by the driver may not be obtained when the vehicle Ve starts being re-accelerated.

Figure 2:
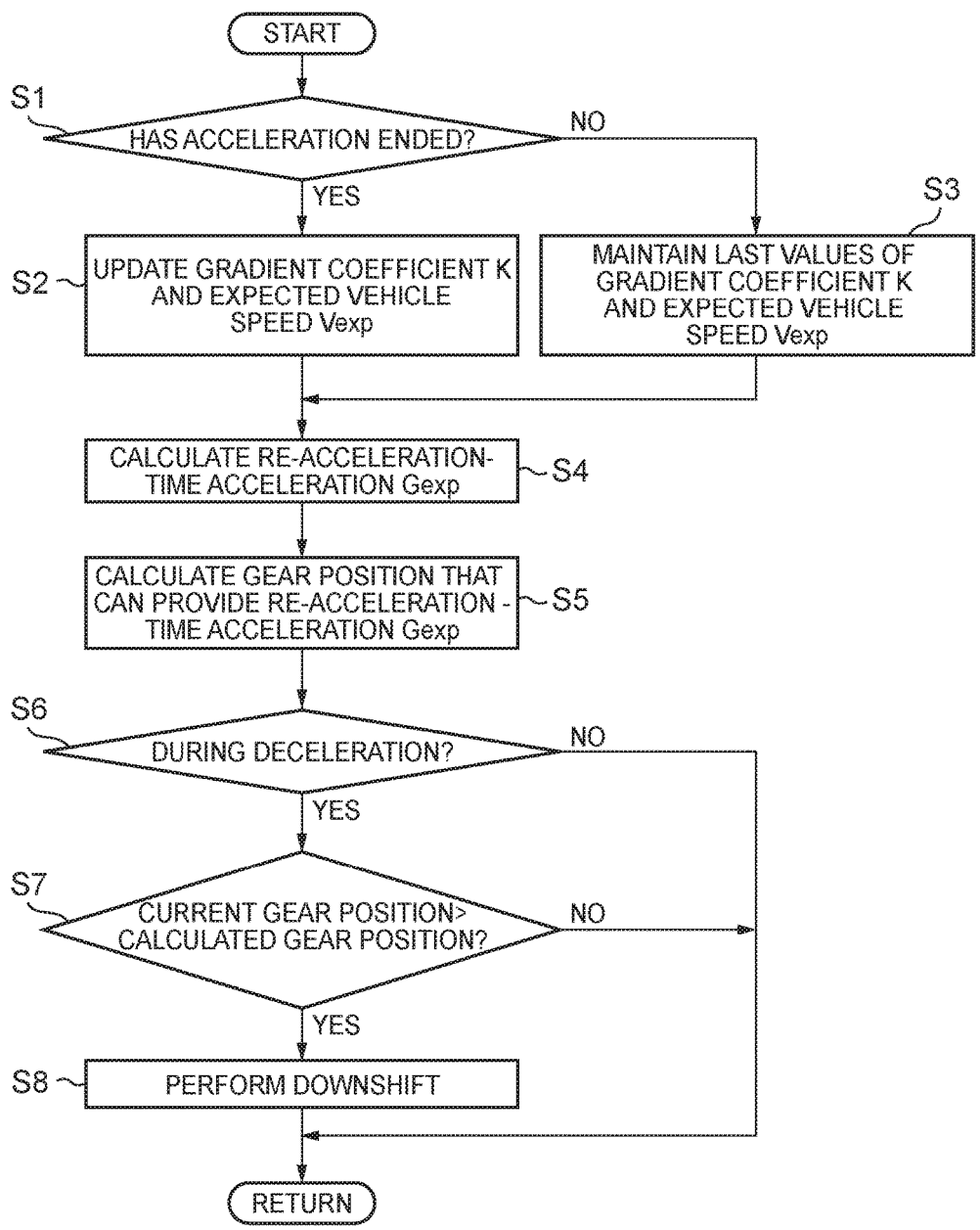
FIG. 2 is a flowchart useful for explaining one example of basic driving force control performed by the driving force control system for the vehicle of the invention.

Thus, the controller 8 is configured to be able to appropriately re-accelerate the vehicle Ve, by performing driving force control on the vehicle Ve such that the intention and driving tendency of the driver are reflected by the control. More specifically, the controller 8 is configured to determine a "re-acceleration-time acceleration" as a control index for use when the vehicle Ve is re-accelerated after being decelerated, and set the speed ratio of the automatic transmission 4 which can achieve the "re-acceleration-time acceleration" thus determined, before the vehicle Ve starts being re-accelerated. The "re-acceleration-time acceleration", which is the control index for use when the vehicle is re-accelerated after being decelerated, is an estimated acceleration desired or expected by the driver at the time when the vehicle Ve is re-accelerated. The "re-acceleration-time acceleration" is obtained based on an acceleration characteristic, and traveling data of the vehicle Ve. The acceleration characteristic, which determines the relationship between the "re-acceleration-time acceleration" and the vehicle speed, is stored in advance in the form of an arithmetic expression or a map. The traveling data of the vehicle Ve include physical quantities indicating traveling conditions of the vehicle Ve, for example, the vehicle speed, acceleration, speed ratio of the automatic transmission 4, and the engine speed, and are extracted from the traveling history obtained before the current deceleration traveling. If the controller 8 is configured to clear traveling data when the ignition switch (or main switch) is turned off, the traveling history before the current deceleration traveling is the history of traveling data obtained from the time when the ignition switch of the vehicle Ve is turned on for current travel, and control that will be described below with reference to FIG. 2 is started for the first time, to the present time.

A control content performed by the controller 8 will be more specifically described below. FIG. 2 is a flowchart useful for explaining one example of basic control. Initially, it is determined whether acceleration traveling of the vehicle Ve has ended, namely, the vehicle Ve has finished traveling with acceleration (step S1). For example, it may be determined whether acceleration traveling has ended, based on a detected value of the vehicle speed sensor 13 or a longitudinal acceleration sensor (not shown). It is determined that "acceleration traveling of the vehicle Ve has ended" in step S1, when the acceleration of the vehicle Ve becomes equal to 0 after it is once determined that the vehicle Ve is traveling while being accelerated, or when the vehicle Ve has shifted to deceleration traveling where the acceleration of the vehicle Ve becomes equal to or lower than 0. The same determination is made when the brake switch 10 is turned on. Accordingly, in all cases other than the above cases, a negative decision (NO) is made in step S1. For example, a negative decision (NO) is made in the case where the vehicle has not travelled while being accelerated since start of this control, the case where the vehicle Ve is traveling while being accelerated, or the case where the vehicle Ve is traveling in a steady state or at a constant speed.

If acceleration traveling of the vehicle Ve has ended, and an affirmative decision (YES) is made in step S1, the controller 8 proceeds to step S2. In step S2, the expected vehicle speed Vexp and the gradient coefficient K are calculated and updated. More specifically, traveling data (e.g., the vehicle speed at the start of acceleration, and the maximum acceleration during acceleration traveling) of the vehicle Ve stored during acceleration traveling, the end of which was determined in step S1, is read, and the expected vehicle speed Vexp and the gradient coefficient K are updated, based on the traveling data. When the driver operates the vehicle Ve, the driver may be assumed to drive the vehicle while aiming at a given vehicle speed all the time. In control performed by the controller 8, the "expected vehicle speed" is defined as the vehicle speed aimed at by the driver, or the vehicle speed presumed to be desired by the driver. Generally, under the same traveling environment, the "expected vehicle speed" is higher as the driving tendency of the driver becomes traveling tendency (sporty traveling tendency) that places more emphasis on power performance or driving performance than normal. To the contrary, the "expected vehicle speed" is lower as the driving tendency of the driver becomes traveling tendency (economy traveling tendency) that places more emphasis on the fuel economy or efficiency than normal. The expected vehicle speed Vexp may be obtained based on the traveling history of the vehicle Ve in which data, such as the vehicle speed, longitudinal acceleration, lateral acceleration, steering angle, road surface gradient, and the vehicle attitude, are recorded. The gradient coefficient K represents the slope or gradient of a correlation line used when the "expected vehicle speed" is determined, as will be described later. The expected vehicle speed Vexp and the gradient coefficient K will be described in more detail later.

If a negative decision (NO) is made in step S1, the controller 8 proceeds to step S3. In step S3, the last values of the expected vehicle speed Vexp and the gradient coefficient K are maintained. Namely, the expected vehicle speed Vexp and gradient coefficient K calculated and stored when acceleration traveling ended last time are maintained until the current acceleration traveling ends. If the vehicle has not travelled with acceleration since start of this control, the expected vehicle speed Vexp and gradient coefficient K stored at the time when the ignition switch was turned on for current travel, and this cycle of control initially started, continue to be maintained. In the arrangement where the expected vehicle speed Vexp and the gradient coefficient K are cleared when the ignition switch is turned off, pre-set initial values of Vexp and K are read when the ignition switch is turned on, and stored as the expected vehicle speed Vexp and the gradient coefficient K. Accordingly, if the vehicle Ve has not travelled while being accelerated since start of this control, the respective initial values of the expected vehicle speed Vexp and gradient coefficient K are maintained, as described above. In the arrangement where the expected vehicle speed Vexp and the gradient coefficient K are stored at the time when the ignition switch is turned off, if the vehicle has not travelled while being accelerated since start of this control, the expected vehicle speed Vexp and the gradient coefficient K stored when the ignition switch was turned off last time are read and continue to be maintained, as described above.

Once the expected vehicle speed Vexp and the gradient coefficient K are updated in the above step S2, or the last values of the expected vehicle speed Vexp and the gradient coefficient K are maintained in the above step S3, the controller 8 proceeds to step S4. In step S4, the re-acceleration-time acceleration Gexp is obtained. When the vehicle Ve is decelerated without being stopped, it shifts to a traveling state of re-acceleration after finishing deceleration traveling. For example, when the vehicle Ve turns a corner, the vehicle Ve generally enters the corner while being decelerated, from a point ahead of the corner. In the corner, the vehicle Ve turns while being decelerated or traveling at a constant speed. Then, the vehicle is re-accelerated when it leaves the corner. Thus, when the vehicle Ve is re-accelerated after being decelerated, the driver may be assumed to accelerate the vehicle Ve toward the expected vehicle speed Vexp. Accordingly, if a vehicle speed difference $\Delta V$ ($\Delta V = Vexp - Vcur$) between the expected vehicle speed Vexp and the current vehicle speed Vcur is large, the driver is presumed to request a large acceleration so as to reduce the vehicle speed difference $\Delta V$, and re-accelerate the vehicle Ve with the acceleration thus requested.

Figure 3:
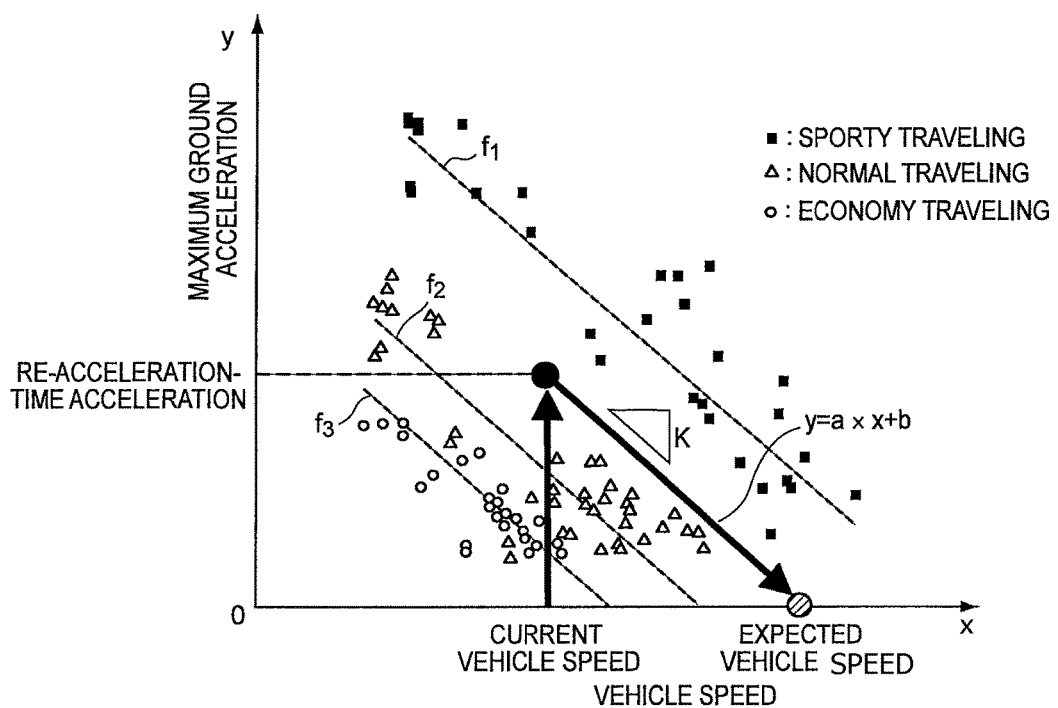
FIG. 3 is a view useful for explaining the correlation between "re-acceleration-time acceleration" and the vehicle speed, which is obtained so as to calculate "expected vehicle speed" and "re-acceleration-time acceleration" in the driving force control of the invention.
Figure 4:
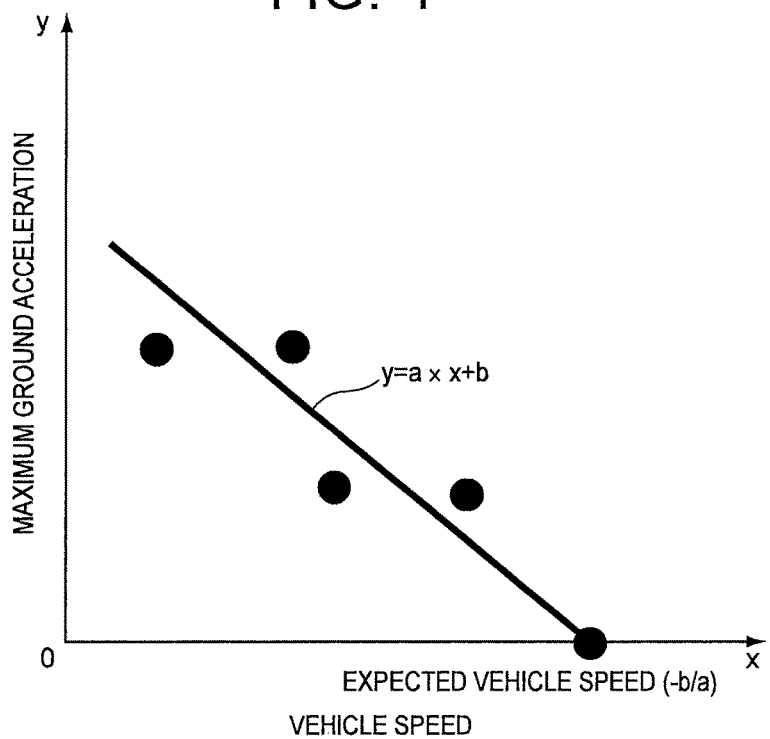
FIG. 4 is a view useful for explaining a correlation line (approximate line) representing the correlation shown in FIG. 3.

On the assumption as described above, in step S4, the re-acceleration-time acceleration Gexp is obtained from the vehicle speed difference $\Delta V$ between the expected vehicle speed Vexp and the current vehicle speed Vcur, as an acceleration expected by the driver to be achieved at the time of re-acceleration. For example, as shown in FIG. 3 and FIG. 4, it is understood from the results of traveling experiments, simulations, or the like, that there is a negative correlation between the above-mentioned "re-acceleration-time acceleration" and the vehicle speed. Where the x-axis indicates the vehicle speed at the time when re-acceleration traveling is started, and the y-axis indicates the acceleration (maximum ground acceleration) at this time, a correlation line (approximate line) of a linear function expressed as "y=ax+b" in FIG. 4 can be obtained. The correlation line may also be obtained for each driving tendency of the driver, as indicated by broken lines $f_1$, $f_2$, $f_3$ in FIG. 3.

As described above, the "expected vehicle speed" is defined as a target vehicle speed desired by the driver to be achieved during acceleration traveling. Therefore, when the vehicle speed reaches the "expected vehicle speed", the vehicle Ve need not be further accelerated; as a result, the acceleration is presumed to be equal to 0. Accordingly, the "expected vehicle speed" can be obtained by calculating an x-intercept (−b/a) at which the acceleration on the y-axis is equal to 0.

The above-mentioned ground acceleration can be obtained as a differential value of detected data of the output shaft speed sensor 12 or the vehicle speed sensor 13, for example. While the acceleration may be obtained by an acceleration sensor installed on the vehicle Ve, noise may be included in detected data of acceleration, due to influences of the attitude of the vehicle Ve and the road surface gradient. Therefore, in this control, the ground acceleration obtained from the rotational speed sensor as indicated above is used.

By using the correlation between the "re-acceleration-time acceleration" and the vehicle speed as described above, the relationship between the "re-acceleration-time acceleration" and the vehicle speed may be defined in advance as an acceleration characteristic of the vehicle Ve, and stored in the controller 8. With the acceleration characteristic defined as a function of the vehicle speed, the "re-acceleration-time acceleration" corresponding to the above-mentioned "expected vehicle speed" and the "current vehicle speed" can be calculated.

The driving force control performed by the controller 8 makes it possible store traveling data at the time when the vehicle starts being re-accelerated, and update the acceleration characteristic that defines the relationship between the "re-acceleration-time acceleration" and the vehicle speed as described above. The traveling data stored in this case includes the vehicle speed and acceleration of the vehicle Ve when it starts being re-accelerated. The acceleration characteristic as described above is stored as an acceleration characteristic line that sets the "re-acceleration-time acceleration" according to the vehicle speed, for example. More specifically, the acceleration characteristic line is a correlation line (approximate line) denoted as "y=a×x+b" in FIG. 4.

Figure 5:
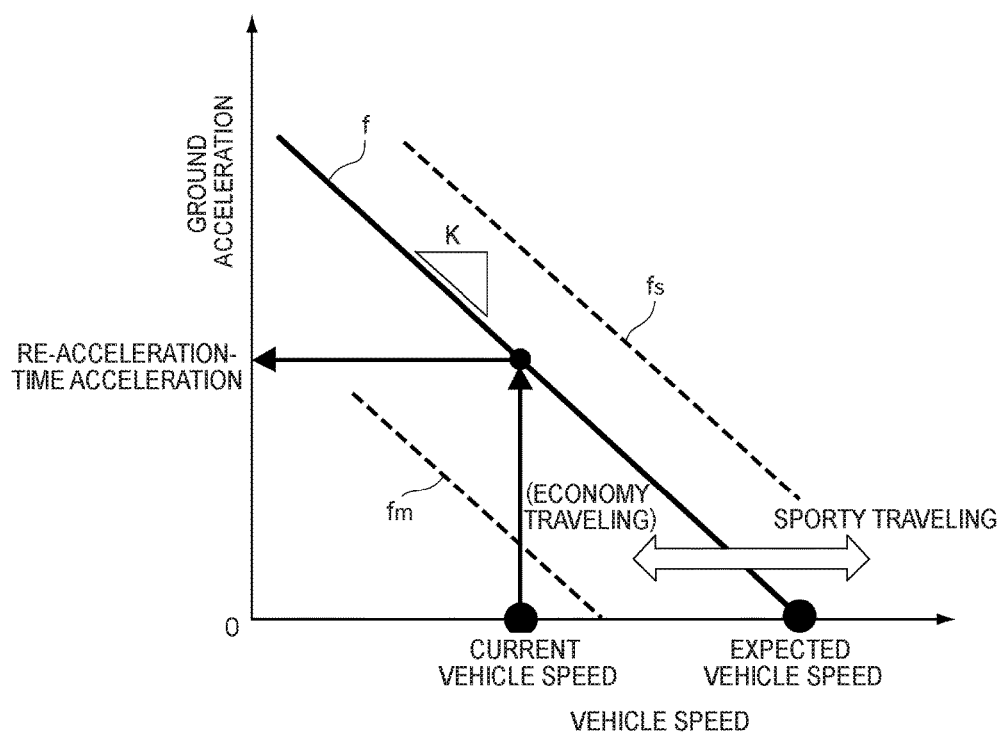
FIG. 5 is a view useful for explaining one example of a control map for obtaining the "re-acceleration-time acceleration" in the driving force control of the invention.

Also, the "re-acceleration-time acceleration" corresponding to the "expected vehicle speed" and the "current vehicle speed" can be obtained from a control map as shown in FIG. 5, for example. Namely, using the above-described correlation between the "re-acceleration-time acceleration" and the vehicle speed obtained from the traveling history or traveling information during previous acceleration traveling, the relationship between the "re-acceleration-time acceleration" and the vehicle speed is defined in advance as an acceleration characteristic of the vehicle Ve, and it can be stored as the control map as shown in FIG. 5 in the controller 8.

In FIG. 5, straight line f indicates an acceleration characteristic that defines the relationship between the "re-acceleration-time acceleration" and the vehicle speed, and corresponds to the above-described correlation line "y=ax+b". The slope of this straight line f indicates the gradient coefficient K. On the straight line f, the vehicle speed at which the ground acceleration becomes equal to 0, namely, the x-intercept of the line f, is the "expected vehicle speed". Accordingly, in FIG. 5, the re-acceleration-time acceleration Gexp can be obtained by assigning the current vehicle speed Vcur to a relational expression indicated by the straight line f that passes the expected vehicle speed Vexp obtained in the above step S2, and the gradient coefficient K.

Also, two or more straight lines f, such as straight line fs and straight line fm as indicated in FIG. 5, may be set for each "expected vehicle speed" as indicated above, or according to the driving tendency. In this case, a certain straight line f is selected from the two or more lines and determined as a correlation line, based on the traveling history obtained during previous acceleration traveling. At the same time, the "expected vehicle speed" is obtained as an x-intercept of the selected line f. The "expected vehicle speed" thus determined based on the history during the previous acceleration traveling reflects the driving tendency that appeared during the previous acceleration traveling. Then, the "re-acceleration-time acceleration" is obtained, based on the "expected vehicle speed" obtained in the manner as described above, and the "current vehicle speed" obtained as the detected value of the vehicle speed sensor 13, for example. As shown in FIG. 5, the "re-acceleration-time acceleration" is larger as a difference between the "expected vehicle speed" and the "current vehicle speed" is larger. Also, as sporty traveling tendency as one type of driving tendency is stronger, the straight line fs that provides the higher "expected vehicle speed" is selected, and the "re-acceleration-time acceleration" obtained based on this line fs becomes larger. To the contrary, as economy traveling tendency as another type of driving tendency is stronger, the straight line fm that provides the lower "expected vehicle speed" is selected, and the "re-acceleration-time acceleration" obtained based on this line fm becomes smaller.

Figure 6:
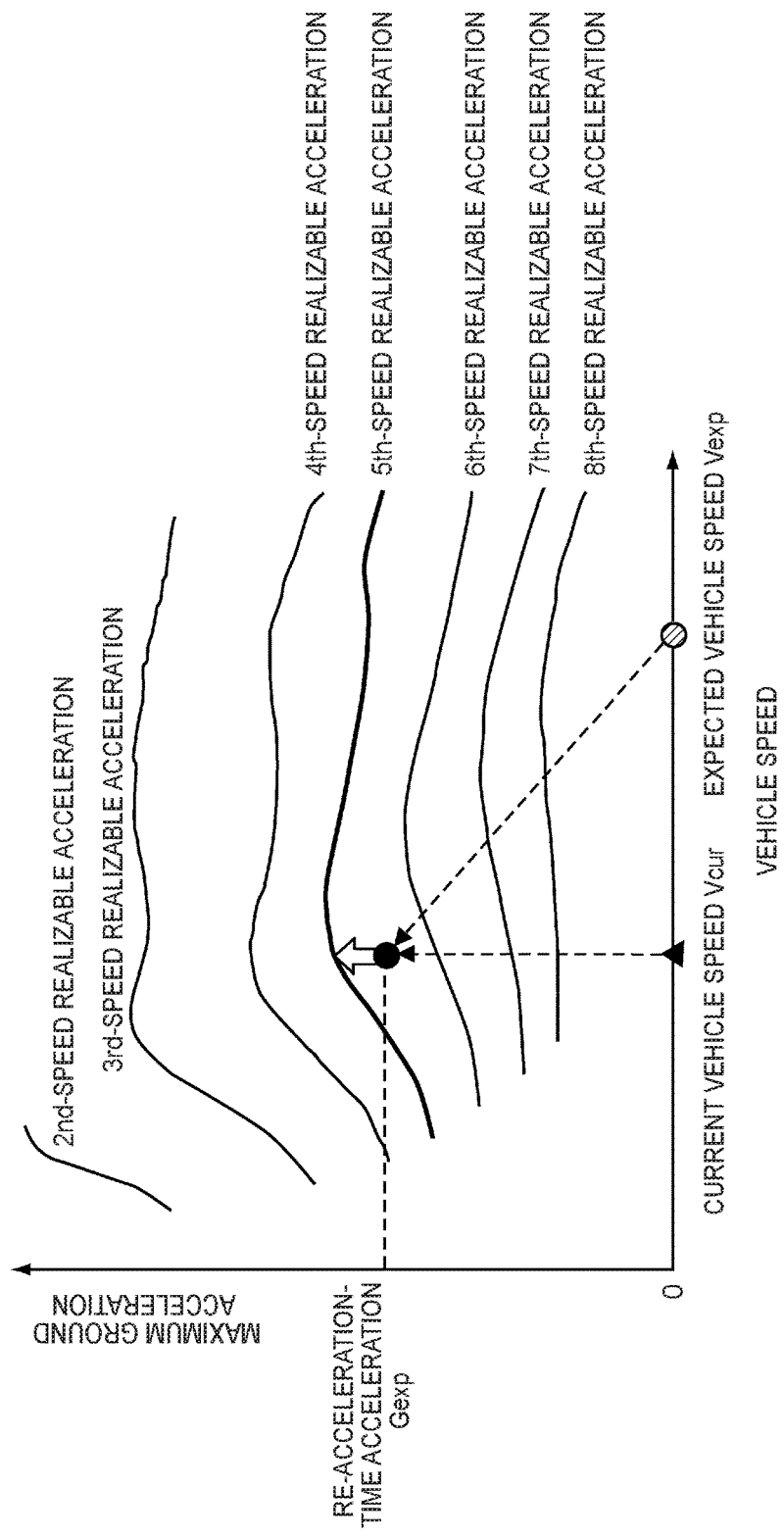
FIG. 6 is a view useful for explaining control for obtaining "realizable acceleration" and a gear position (speed ratio) that can provide the realizable acceleration, in the driving force control of the invention.

Once the re-acceleration-time acceleration Gexp is obtained in step S4 in the manner as described above, the gear position of the automatic transmission 4 which can realize the re-acceleration-time acceleration Gexp is obtained (step S5). Namely, the optimum gear position set for the automatic transmission 4 so that the vehicle Ve travels at the re-acceleration-time acceleration Gexp is obtained. One example of a method for obtaining the gear position is shown in FIG. 6. Initially, the achievable acceleration Gable is set. The realizable acceleration Gabl can be calculated from a computational expression: Gabl=($Te_{max}$× g−R)/W, where $Te_{max}$ is the maximum value of the output torque of the engine 3, R is the travel resistance, W is the weight of the vehicle, and g is the gear ratio. As shown in FIG. 6, the realizable acceleration Gable is calculated for each gear position of the automatic transmission 4.

FIG. 6 illustrates an example in which the automatic transmission 4 is a forward eight-speed transmission having eight forward gear positions. In the example shown in FIG. 6, the highest-speed gear position (the fifth speed in the example of FIG. 6), out of the gear positions (the second, third, fourth and fifth speeds in the example of FIG. 6) capable of achieving the "re-acceleration-time acceleration", is selected, with respect to the "re-acceleration-time acceleration" obtained from the "expected vehicle speed" and the "current vehicle speed". Namely, in FIG. 6, the re-acceleration-time acceleration Gexp is denoted as a point of intersection between the correlation line that passes the expected vehicle speed Vexp and the straight line indicating the current vehicle speed Vcur. The point indicating the re-acceleration-time acceleration Gexp is located between the realizable acceleration Gabl of the fifth speed and the realizable acceleration Gabl of the sixth speed. This means that, when the engine 3 generates the maximum torque, the re-acceleration-time acceleration Gexp cannot be realized if the automatic transmission 4 is placed in any of the gear positions (the sixth speed, seventh speed and eight speed) equal to or higher than the sixth speed. Accordingly, in the example shown in FIG. 6, the fifth speed as the highest speed among the gear positions (from the fifth speed to the second speed) of the automatic transmission 4 which can realize the re-acceleration-time acceleration Gexp and are equal to or lower than the fifth speed is selected.

If the gear position (speed ratio) of the automatic transmission 4, which can realize the re-acceleration-time acceleration Gexp, is calculated in step S5, it is determined whether the vehicle Ve is traveling while being decelerated (step S6). For example, it can be determined whether the vehicle Ve is traveling while being decelerated, based on a detected value of the vehicle speed sensor 13 or a longitudinal acceleration sensor (not shown), for example, an operation signal of the brake switch 10, or the like. If the vehicle Ve is not being decelerated, and a negative decision (NO) is made in step S6, the controller 8 once finishes this routine without performing subsequent control.

On the other hand, if the vehicle Ve is being decelerated, and an affirmative decision (YES) is made in step S6, the controller 8 proceeds to step S7. In step S7, it is determined whether the gear position currently established in the automatic transmission 4 is a higher-speed gear position than the gear position calculated in the above step S5, namely, whether the speed ratio of the current gear position is smaller than the speed ratio of the calculated gear position. If the current gear position is a lower-speed gear position than the calculated gear position, and a negative decision (NO) is made in step S7, the controller 8 once finishes the routine, without performing subsequent control.

If, on the other hand, the current gear position is a higher-speed gear position than the calculated gear position, and an affirmative decision (YES) is obtained in step S7, the controller 8 proceeds to step S8, in which the automatic transmission 4 is shifted down to the calculated gear position. Then, the controller 8 once finishes the routine of FIG. 2.

Figure 7A:
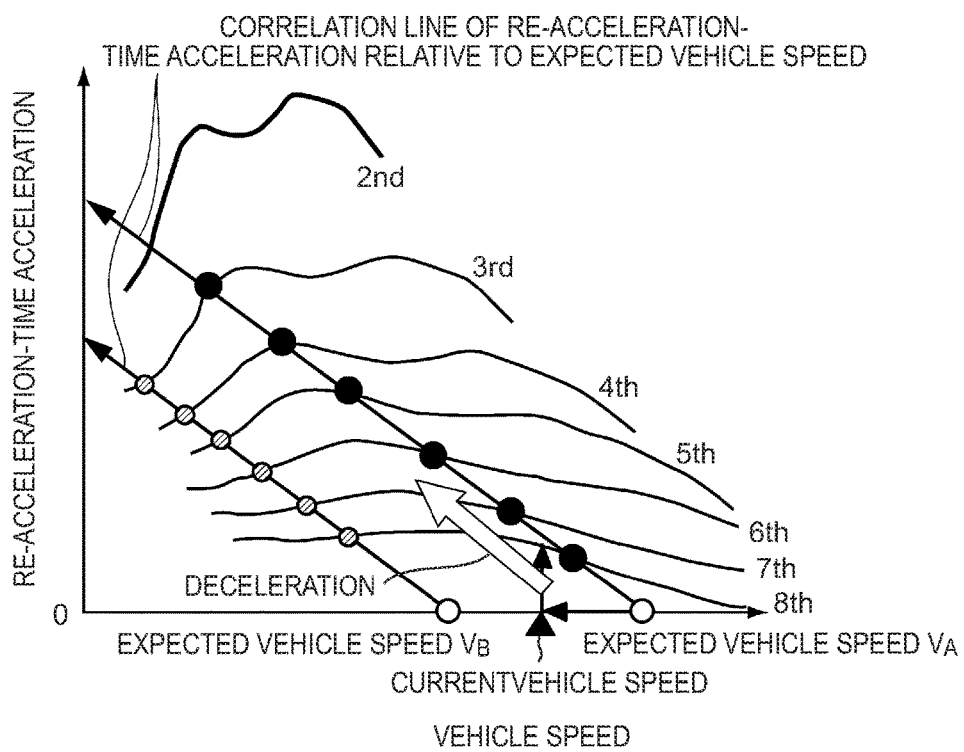
FIG. 7A and FIG. 7B are views useful for explaining the behavior (such as the vehicle speed, acceleration, and the engine speed) of the vehicle when the driving force control of the invention is performed.
Figure 7B:
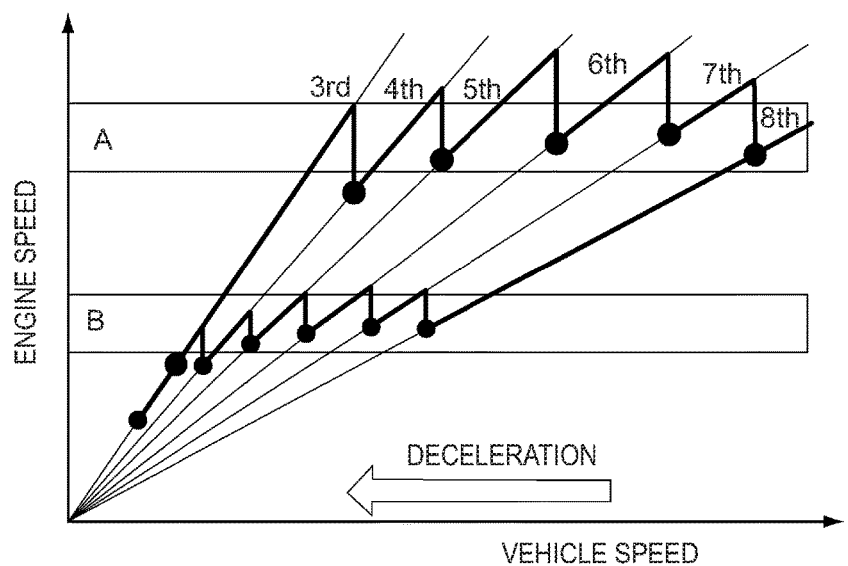

FIGS. 7A and 7B show images of operation of the vehicle Ve when the vehicle Ve travels while being decelerated in two cases, i.e., the case where the expected vehicle speed is equal to $V_A$, and the case where the expected vehicle speed is equal to $V_B$ that is lower than $V_A$. As shown in FIG. 7A, downshifts are performed at shift points (indicated by black circles) on correlation lines corresponding to the expected vehicle speeds $V_A$, $V_B$, respectively. FIG. 7B indicates the engine speeds into which the shift points shown in FIG. 7A are converted. Approximately, downshifts are performed in rotational speed ranges A, B corresponding to the expected vehicle speeds $V_A$, $V_B$, respectively.

Figure 8:
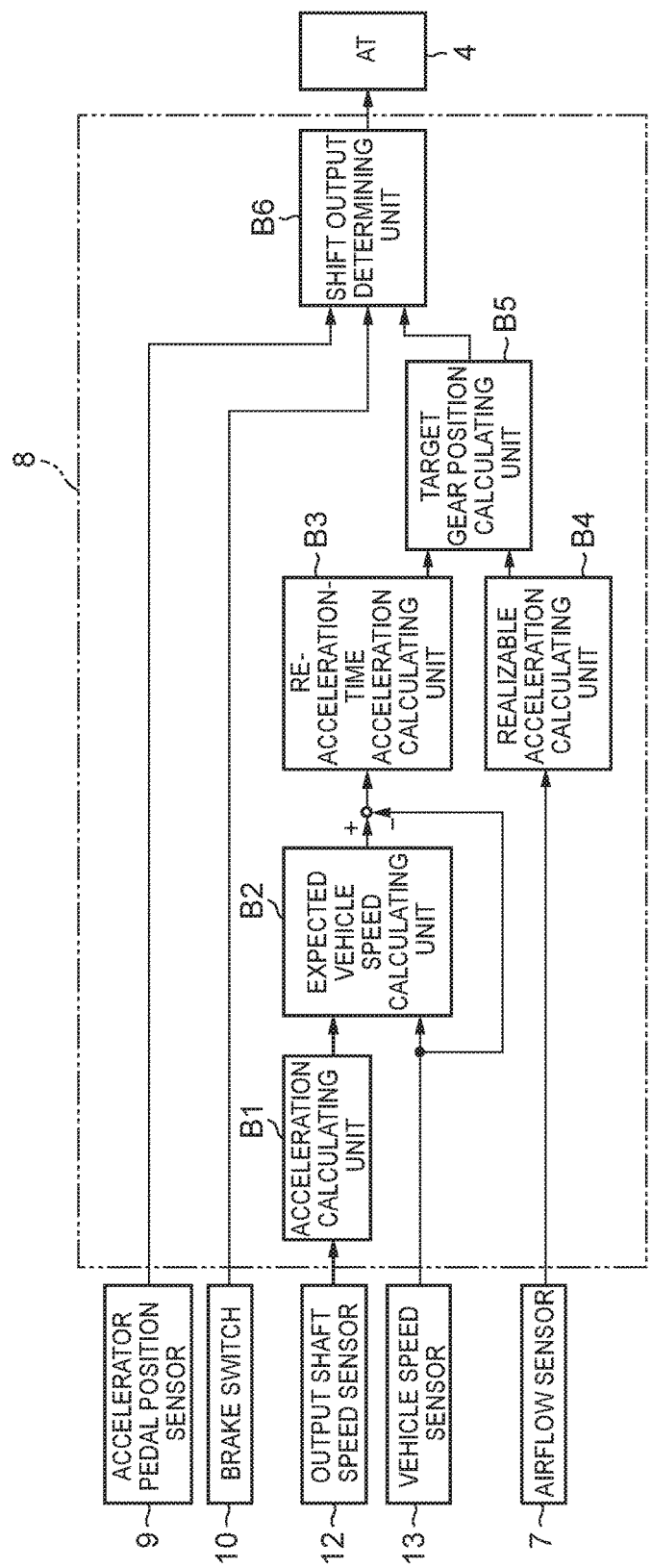
FIG. 8 is a block diagram useful for explaining the configuration of a controller that constitutes the driving force control system for the vehicle of the invention.

The specific configuration of the controller 8 that performs control during deceleration traveling as described above is illustrated in the block diagram of FIG. 8. As one example, the controller 8 consists of an acceleration calculating unit B1, an expected vehicle speed calculating unit B2, a re-acceleration-time acceleration calculating unit B3, a realizable acceleration calculating unit B4, a target gear position calculating unit B5, and a shift output determining unit B6, as shown in FIG. 8.

The acceleration calculating unit B1 calculates the acceleration of the vehicle Ve based on detected data of the output shaft speed sensor 12. The acceleration calculating unit B1 may also calculate the acceleration of the vehicle Ve from detected data of the vehicle speed sensor 13. The expected vehicle speed calculating unit B2 calculates the expected vehicle speed Vexp, based on the acceleration data calculated in the acceleration calculating unit B1 and detected data of the vehicle speed sensor 13. The re-acceleration-time acceleration calculating unit B3 calculates the re-acceleration-time acceleration Gexp, based on a vehicle speed difference ΔV between the expected vehicle speed Vexp calculated in the expected vehicle speed calculating unit B2 and the current vehicle speed Vcur obtained from detected data of the vehicle speed sensor 13. On the other hand, the realizable acceleration calculating unit B4 calculates the realizable acceleration Gabl for each gear position (or each speed ratio) of the automatic transmission 4, based on detected data of the airflow sensor 7. The target gear position calculating unit B5 calculates a target gear position (or target speed ratio) for the automatic transmission 4, based on the re-acceleration-time acceleration Gexp calculated in the above-indicated re-acceleration-time acceleration calculating unit B3, and the realizable acceleration Gabl calculated in the realizable acceleration calculating unit B4. Then, the shift output determining unit B6 makes a determination concerning a shift command to the automatic transmission 4, based on the target gear position calculated in the above-indicated target gear position calculating unit B5, detected data of the accelerator pedal position sensor 9, and detected data of the brake switch 10. More specifically, it is determined whether the automatic transmission 4 needs to be shifted down.

Figure 9A:
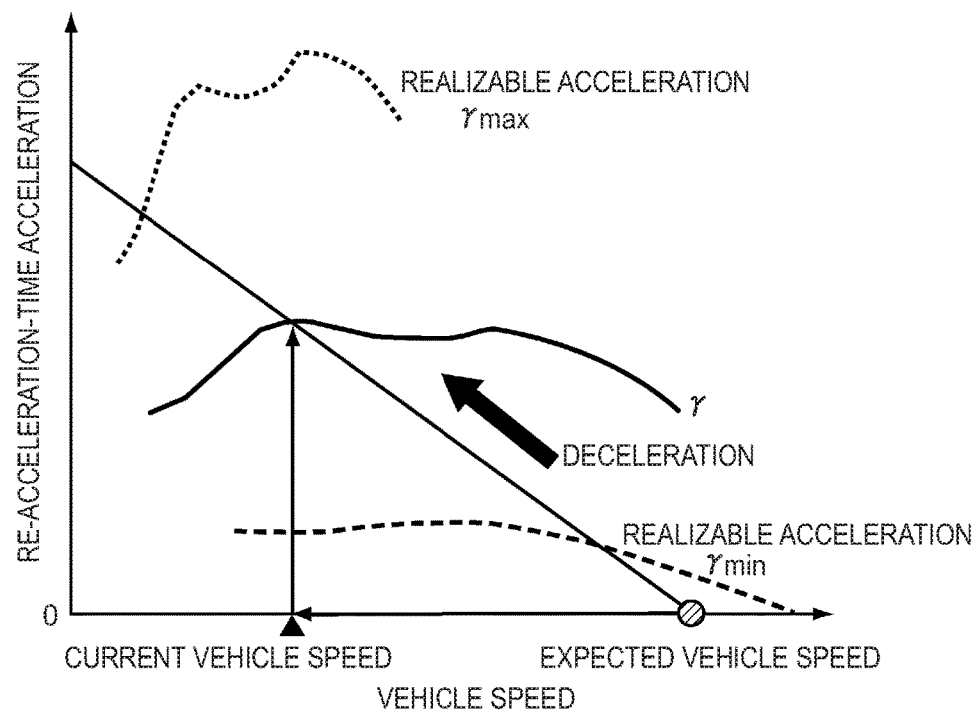
FIG. 9A and FIG. 9B are views useful for explaining the behavior (such as the vehicle speed, acceleration, and the engine speed) of the vehicle when the driving force control of the invention is performed on a vehicle on which a continuously variable transmission is installed.
Figure 9B:
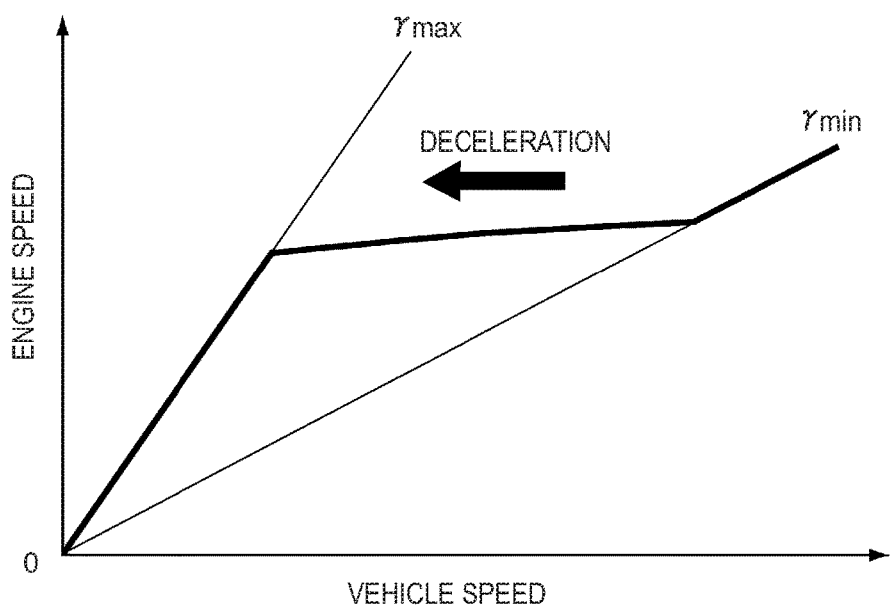

While the automatic transmission 4 is a forward eight-speed transmission having eight forward gear positions in the example of FIG. 6, FIG. 7A and FIG. 7B, this invention may be applied to a belt-type or toroidal-type continuously variable transmission, or an electric stepless shifting mechanism in a hybrid vehicle. When the automatic transmission 4 is a continuously variable transmission or an electric stepless shifting mechanism of a hybrid vehicle as described above, the speed ratio of the automatic transmission 4 which can realize the "re-acceleration-time acceleration" is calculated, and the automatic transmission 4 is controlled based on the calculated speed ratio. For example, as shown in FIG. 9A, the speed ratio γ that can realize the "re-acceleration-time acceleration" is obtained from the "current vehicle speed" and the "expected vehicle speed", and the automatic transmission 4 is controlled based on the speed ratio γ. The behavior of the engine speed in this case is shown in FIG. 9B.

Figure 10:
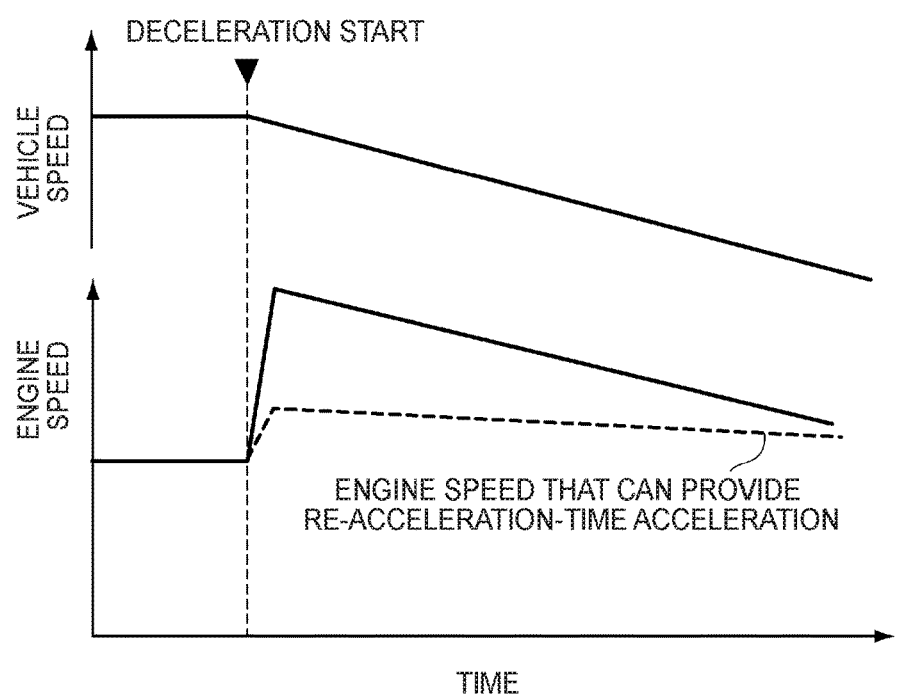
FIG. 10 is a view useful for explaining another control example when the driving force control of the invention is performed on the vehicle on which the continuously variable transmission is installed.

When the automatic transmission 4 is a continuously variable transmission or an electric stepless shifting mechanism of a hybrid vehicle as described above, and the vehicle continues to be decelerated after a downshift for increasing the speed ratio is performed during deceleration traveling, the engine speed (solid line) may be controlled to be reduced according to the vehicle speed, within a range in which the "re-acceleration-time acceleration" can be provided, more specifically, within a range in which the engine speed does not become lower than the rotational speed (broken line) that can provide the re-acceleration-time acceleration in FIG. 10. In this manner, an appropriate deceleration feeling can be given to the driver, during deceleration traveling.

When the vehicle Ve travels while being decelerated based on the "expected vehicle speed" and the "re-acceleration-time acceleration" as described above, the engine speed may be controlled such that the region of the engine speed used is changed according to the magnitude of the "expected vehicle speed". For example, as shown in FIGS. 11A, 11B, when the vehicle is decelerated in two cases, i.e., the case where the expected vehicle speed is equal to $V_c$, and the case where the expected vehicle speed is equal to $V_d$ that is lower than $V_c$, the lowest engine speeds corresponding to these expected vehicle speeds $V_c$, $V_d$ are respectively obtained from the map as shown in FIG. 11A. The lowest engine speed in this case is a lower-limit engine speed that should be ensured so as to accelerate the vehicle Ve at the "re-acceleration-time acceleration" when the vehicle is accelerated after being decelerated. Then, as shown in FIG. 11B, downshift is performed during deceleration traveling with the lowest engine speed obtained as described above set as the lower limit. While the automatic transmission 4 is a forward eight-speed transmission having eight forward gear positions in the example of FIG. 11B, the control performed during deceleration traveling as shown in FIGS. 11A, 11B may be applied to the case where the automatic transmission 4 is a continuously variable transmission, or an electric stepless shifting mechanism of a hybrid vehicle. With the above control thus performed, the automatic transmission 4 can be shifted down during deceleration with a certain degree of regularity, and good travel feeling can be given to the driver at the time of downshift.

Figure 12A:
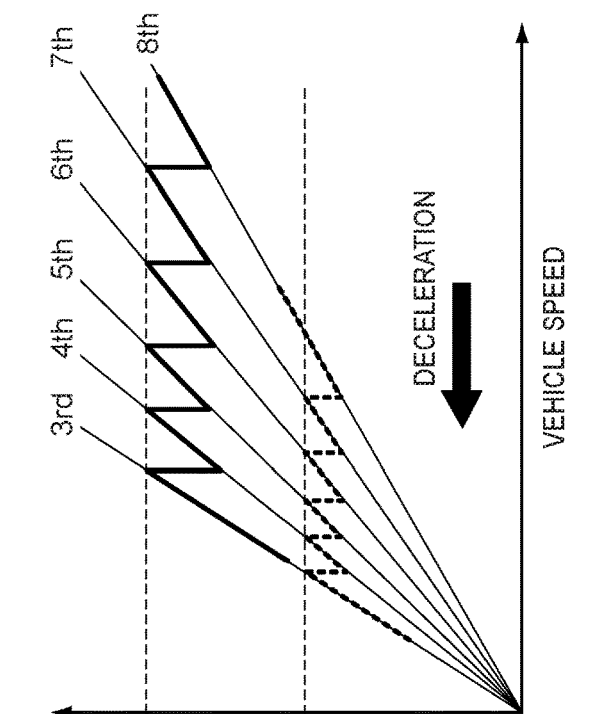
FIG. 12A and FIG. 12B are views useful for explaining a still further control example when the driving force control of the invention is performed.
Figure 12B:
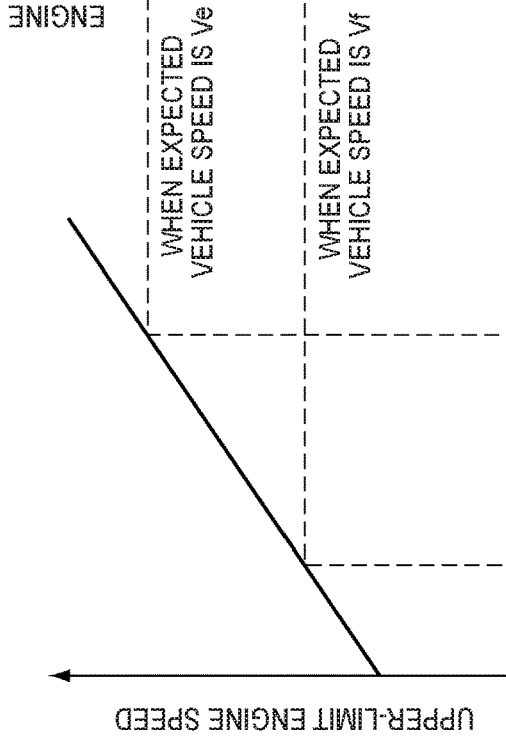

While the automatic transmission 4 is shifted down during deceleration traveling, with the predetermined lowest engine speed set as the lower limit, in the example of FIGS. 11A, 11B, the maximum engine speed may be set as the upper limit, and the automatic transmission 4 may be controlled to be shifted down with the maximum engine speed set as the upper limit. For example, as shown in FIGS. 12A, 12B, when the vehicle Ve is decelerated in two cases, i.e., the case where the expected vehicle speed is equal to $V_e$, and the case where the expected vehicle speed is equal to $V_f$ that is lower than $V_e$, the maximum engine speeds corresponding to the expected vehicle speeds $V_e$, $V_f$ are respectively obtained from the map as shown in FIG. 12A. The maximum engine speed in this case is the upper-limit engine speed within a range of the engine speed which should be ensured so as to accelerate the vehicle Ve at the "re-acceleration-time acceleration" when the vehicle is accelerated after the deceleration traveling. The maximum or upper-limit engine speed is set so that the engine speed does not excessively increase at the time of downshift during deceleration traveling. As shown in FIG. 12B, the automatic transmission 4 is shifted down during deceleration traveling with the thus obtained maximum engine speed set as the upper limit. While the automatic transmission 4 is a forward eight-speed transmission having eight forward gear positions in the example of FIG. 12B, the control performed during deceleration traveling as shown in FIGS. 12A, 12B may be applied to the case where the automatic transmission 4 is a continuously variable transmission, or an electric stepless shifting mechanism of a hybrid vehicle, like the control shown in FIGS. 11A, 11B.

Figure 13:
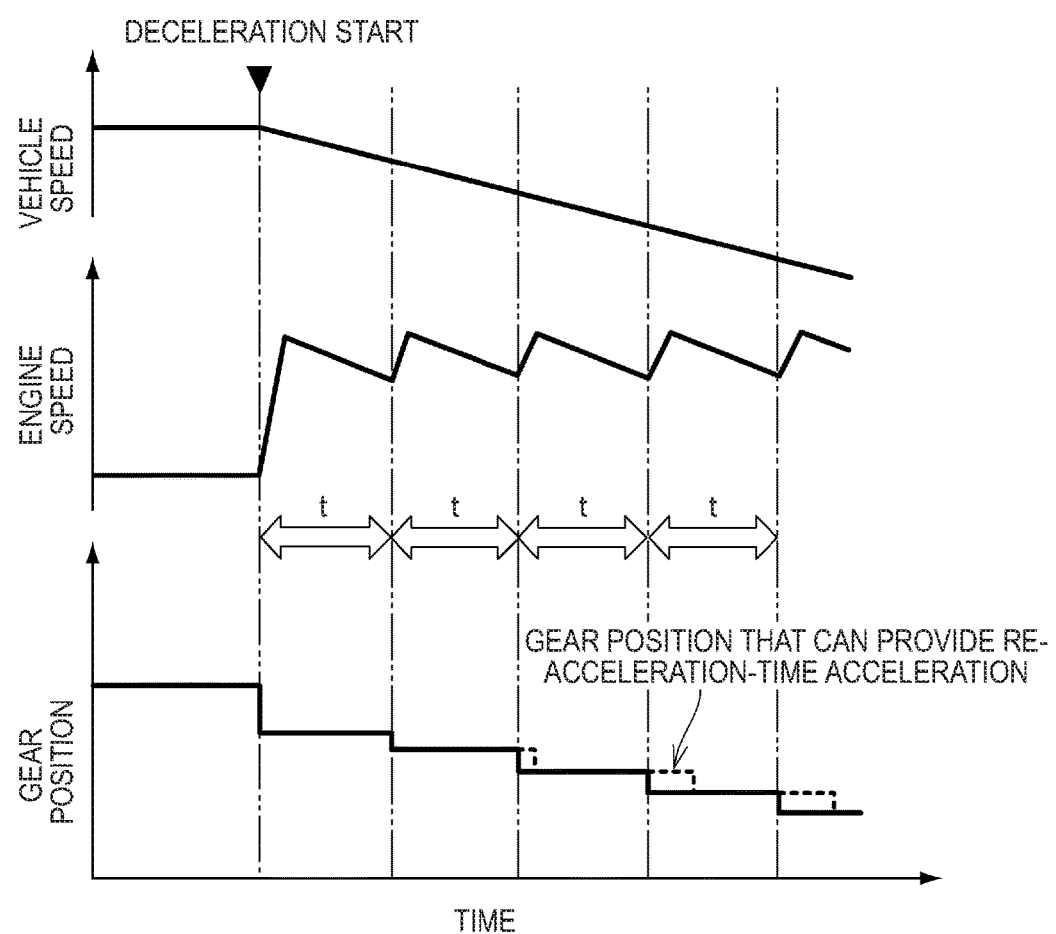
FIG. 13 is a view useful for explaining a still another control example when the driving force control of the invention is performed.

In the above-described embodiment, the automatic transmission 4 is controlled to be shifted down during deceleration traveling, based on the "expected vehicle speed" and the "current vehicle speed", and the "re-acceleration-time acceleration" obtained from the "expected vehicle speed" and the "current vehicle speed". However, the automatic transmission 4 may be controlled to be shifted down during deceleration traveling, at predetermined intervals of a period t, as shown in FIG. 13, for example. The period t in this case may be set in advance according to the driving tendency of the driver. For example, when the driving tendency is sporty traveling tendency, downshifts are performed at given intervals of a period t that is shorter than that in the case where the driving tendency is not the sporty traveling tendency. Also, the interval of downshifts in this case is set within a range of the gear positions (speed ratios) that can realize the "realizable acceleration" obtained based on the "re-acceleration-time acceleration" as described above. Namely, the gear position (speed ratio) is set within a range in which the vehicle Ve can be always accelerated at the "re-acceleration-time acceleration" when it is re-accelerated after the downshift. With this control, the automatic transmission 4 can be shifted down with certain regularity during deceleration traveling. Also, the timing of downshifts can be predicted. Therefore, good travel feeling can be given to the driver at the time of downshifts.

Figure 14:
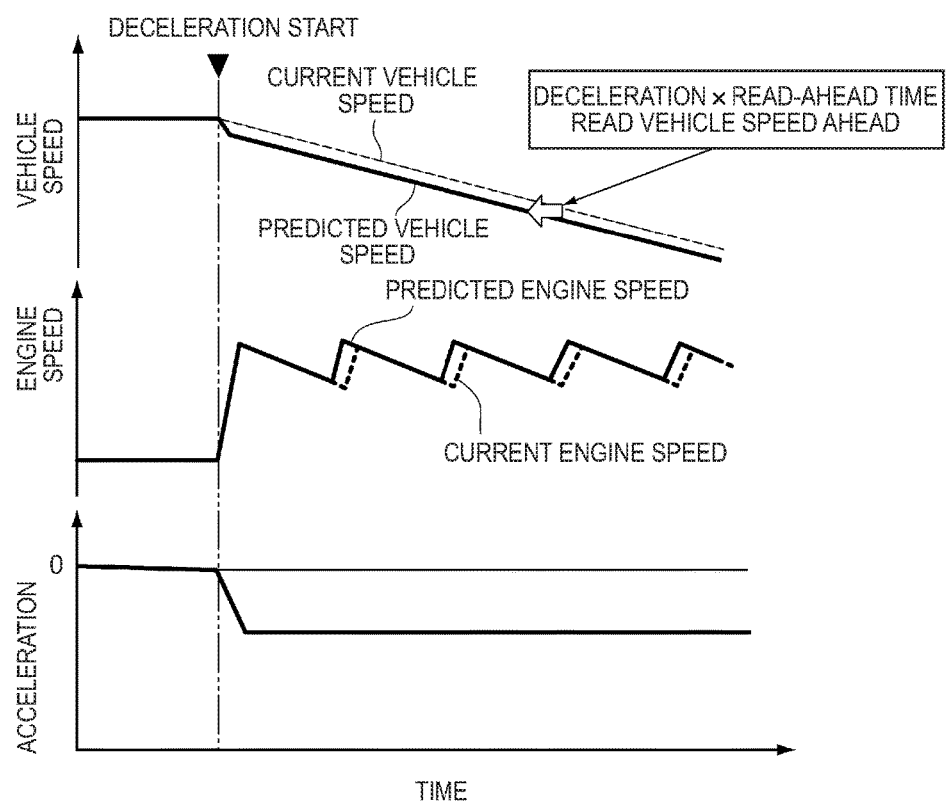
FIG. 14 is a view useful for explaining another control example when the driving force control of the invention is performed.

When the automatic transmission 4 is shifted down during deceleration traveling, based on the "expected vehicle speed", the "current vehicle speed", and the "re-acceleration-time acceleration", as in each of the above-described embodiments, there arises an inevitable response delay between the time when the "re-acceleration-time acceleration" is obtained and the time when the gearshift is actually started. If the response delay is large, the timing of actual downshifts does not match the timing of downshifts intended or predicted by the driver, and the driver may feel strange or uncomfortable. Thus, as shown in FIG. 14 by way of example, downshifts may be carried out ahead of the normal timing, using the "predicted vehicle speed" (solid line) read a given length of time ahead, relative to the "current vehicle speed" (broken line) obtained from the actual vehicle speed. The "predicted vehicle speed" may be obtained by multiplying the acceleration (more specifically, deceleration) of the vehicle Ve, by a read-ahead time obtained by experiment or simulation, for example. In FIG. 14, the current engine speed (broken line) corresponding to the "current vehicle speed", and the predicted engine speed (solid line) corresponding to the "predicted vehicle speed" are also indicated. Thus, the control as described above in each of the above embodiments is performed, based on the vehicle speed thus read ahead, so that the problem caused by the response delay of downshift as described above can be eliminated. As a result, the travel feeling of the vehicle Ve can be improved.

The deceleration of the vehicle Ve used for obtaining the above-mentioned "predicted vehicle speed" can be calculated from detected data of the output shaft speed sensor 12 or the vehicle speed sensor 13 as described above. The deceleration may also be obtained from detected data of an acceleration sensor installed on the vehicle Ve. Also, the deceleration may be calculated based on detected data of a brake pressure sensor provided in a braking system.

Figure 15:
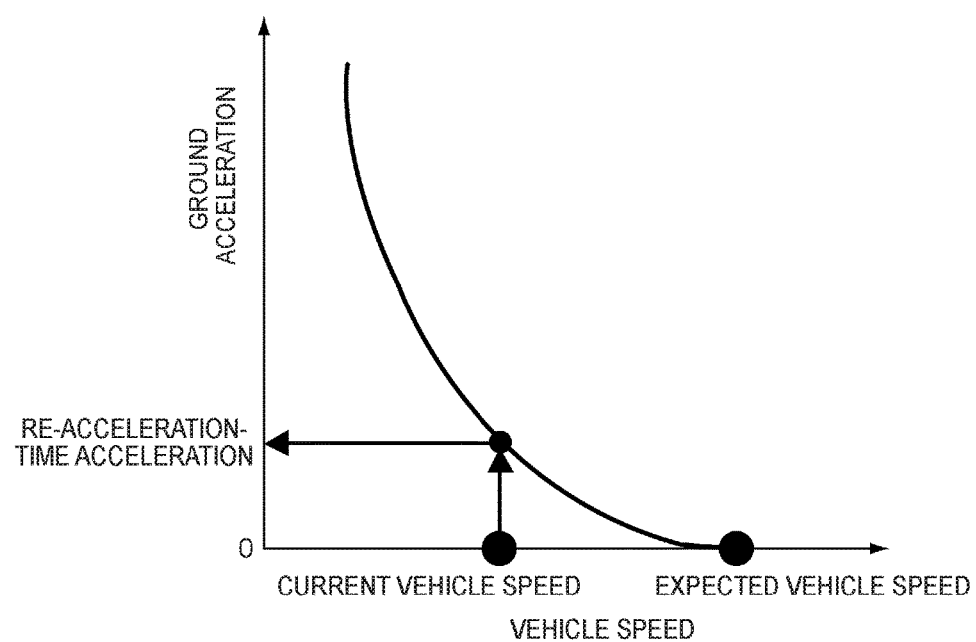
FIG. 15 is a view useful for explaining another example of the control map shown in FIG. 5.

While the correlation line indicating the relationship between the "re-acceleration-time acceleration" and the vehicle speed is in the form of a line representing a linear function, in the control map of FIG. 5 as described above, the correlation line may be non-linear, as indicated in FIG. 15 by way of example. The line of correlation between the "re-acceleration-time acceleration" and the vehicle speed is not limited to a linear function as in the above-described embodiments, but may be represented by a quadratic function or an exponential function, for example. In this case, the control of each of the above-described embodiments may be performed, using the non-linear control map as shown in FIG. 15.

Figure 16:
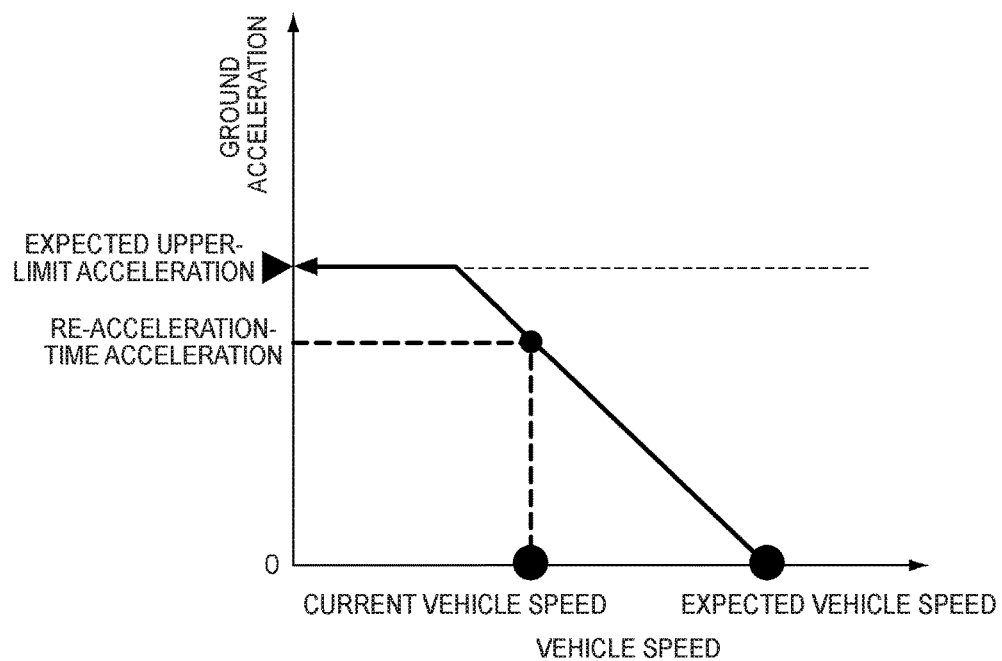
FIG. 16 is a view useful for explaining another example of the control map shown in FIG. 5.

When the control is performed using the above-described control map as shown in FIG. 5 or FIG. 15, there is actually an upper limit to the acceleration expected or requested by the driver during re-acceleration traveling. If a gear position (speed ratio) that would give rise to an acceleration larger than the upper limit is set, and the automatic transmission 4 is shifted down to this gear position, a lower gear position (or larger speed ratio) than that assumed by the driver is selected, and the driver may feel strange or uncomfortable. Accordingly, in the control map of FIG. 5 or FIG. 15, the "re-acceleration-time acceleration" that is larger than that expected by the driver is substantially not needed. Therefore, the control map of FIG. 5, for example, may be replaced with a control map provided with the "expected upper-limit acceleration", as shown in FIG. 16. Thus, by setting the upper limit of the acceleration determined in view of the driver's intention or expected value, in the control map used for determining the "re-acceleration-time acceleration", it is possible to appropriately shift down the automatic transmission 4, while preventing the gear position (speed ratio) that would be beyond the driver's assumption from being set as described above.

Figure 17:
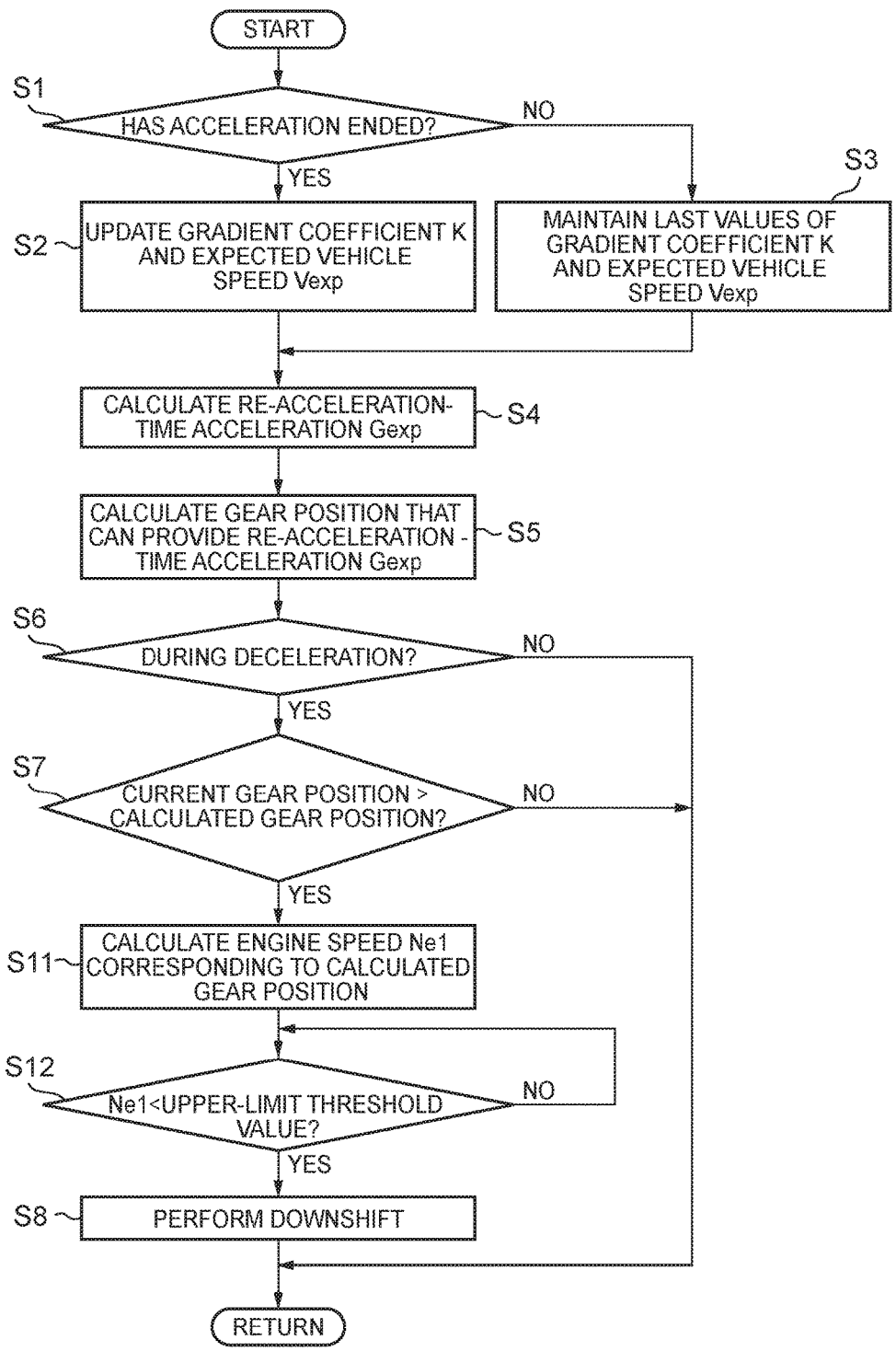
FIG. 17 is a flowchart useful for explaining another example of driving force control performed by the driving force control system for the vehicle of the invention.

In the flowchart of FIG. 17, a modified example of the control illustrated in the flowchart of FIG. 2 as described above is illustrated. In the control example shown in the flowchart of FIG. 17, a downshift is performed only after it is determined that the engine speed becomes lower than a given upper-limit threshold value, so that the engine speed does not excessively increase at the time of the downshift during deceleration traveling. In the flowchart of FIG. 17, the control content of step S11 and step S12 is added to the flowchart of FIG. 2. Accordingly, in the control example shown in the flowchart of FIG. 17, the expected vehicle speed Vexp, re-acceleration-time acceleration Gexp, realizable acceleration Gabl, and the gear position (speed ratio) that can provide the realizable acceleration Gabl are calculated in step S1 through step S5, like the control illustrated in the flowchart of FIG. 2. Also, in step S6, it is determined whether the vehicle Ve is traveling while being decelerated. If a negative decision (NO) is made in step S6, the controller 8 once finishes this routine without performing subsequent control. On the other hand, if the vehicle Ve is traveling while being decelerated, and an affirmative decision (YES) is made in step S6, the controller 8 proceeds to step S7.

In step S7, it is determined whether the gear position currently established in the automatic transmission 4 is a higher-speed gear position than the gear position calculated in the above step S5. Namely, it is determined whether the speed ratio of the current gear position is smaller than the speed ratio of the calculated gear position. If the current gear position is a lower-speed gear position than the calculated gear position, and a negative decision (NO) is made in step S7, the controller 8 once finishes this routine, without performing subsequent control. On the other hand, if the current gear position is a higher-speed gear position than the calculated gear position, and an affirmative decision (YES) is made in step S7, the controller 8 proceeds to step S11.

In step S11, the engine speed Ne1 corresponding to the calculated gear position (speed ratio) is calculated. Namely, the engine speed Ne1 presumed to be reached when the automatic transmission 4 is shifted down to the calculated gear position (speed ratio) is obtained.

Once the engine speed Ne1 is calculated in step S11, it is determined whether the engine speed Ne1 is lower than an upper-limit threshold value (step S12). The upper-limit threshold value used in this case is the upper-limit value of the engine speed which is determined so that the engine speed does not excessively increase at the time of downshift during deceleration traveling.

If the engine speed Ne1 is still equal to or higher than the upper-limit threshold value, and a negative decision (NO) is made in step S12, the controller 8 repeats control of step S12, without proceeding to the following step. Namely, control of step S12 is repeatedly performed until the engine speed Ne1 becomes lower than the upper-limit threshold value.

Then, if the engine speed Ne1 becomes lower than the upper-limit threshold value, and an affirmative decision (YES) is made in step S12, the controller 8 proceeds to step S8. In step S8, the automatic transmission 4 is shifted down to the calculated gear position (speed ratio). Thereafter, the controller 8 once finishes this routine.

In the above manner, the automatic transmission 4 is shifted down in view of the engine speed during deceleration traveling, so that the driver is less likely or unlikely to feel strange or uncomfortable about a situation where the engine speed excessively increases at the time of downshift. Therefore, the travel feeling of the vehicle Ve upon downshift during deceleration traveling can be improved.

Figure 18:
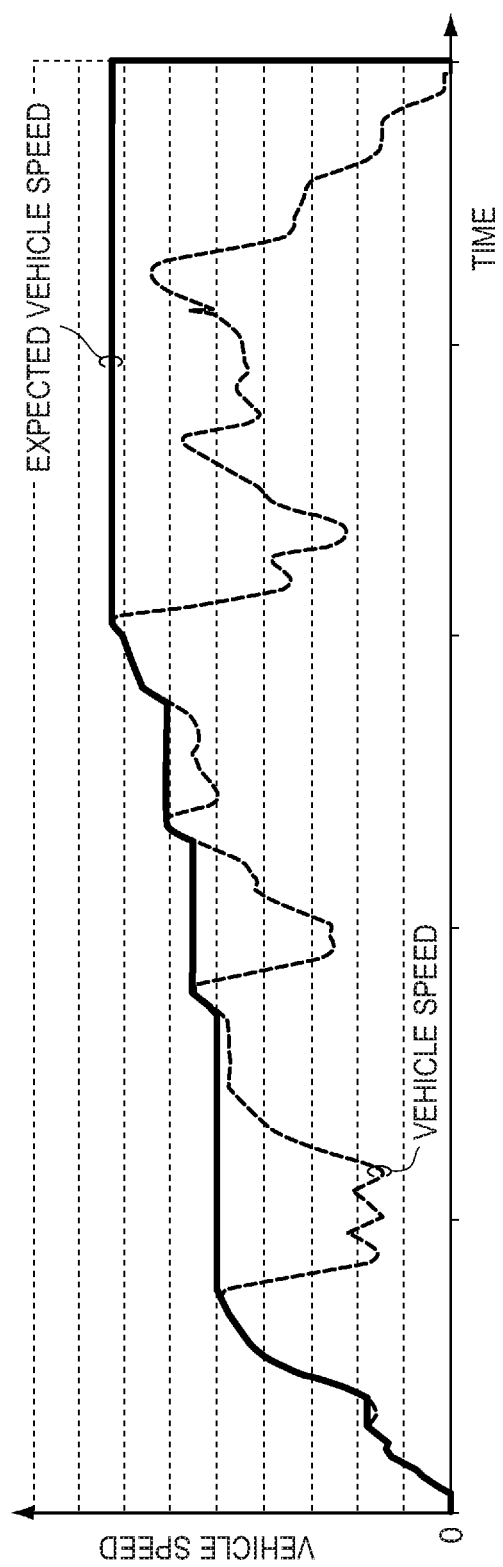
FIG. 18 is a time chart useful for explaining an example of obtaining the "expected vehicle speed" under driving force control according to the flowchart shown in FIG. 17.

In the above-described embodiment, the "expected vehicle speed" is obtained from the control map as shown in FIG. 5, for example. Namely, the "expected vehicle speed" is obtained, using the correlation between the "re-acceleration-time acceleration" and the vehicle speed. As described above, according to this invention, the "expected vehicle speed" is defined as a target vehicle speed aimed by the driver to be achieved when the vehicle is accelerated. From this definition, it can be presumed that, when the vehicle speed reaches the "expected vehicle speed" during acceleration traveling, the acceleration becomes equal to 0, and the vehicle will not be further accelerated. Accordingly, as shown in the time chart of FIG. 18, the highest vehicle speed recorded by the vehicle Ve during previous acceleration traveling before deceleration traveling immediately before the re-acceleration traveling in question is started (namely, the vehicle speed at which the acceleration becomes equal to 0 during traveling) may be set as the "expected vehicle speed". The previous acceleration traveling means acceleration traveling performed from the time when the "expected vehicle speed" has not been set to the time when the deceleration traveling of this cycle is started. For example, if the controller 8 is configured to clear the "expected vehicle speed" when the ignition switch (or main switch) is turned off, the previous acceleration traveling is acceleration traveling performed during a period from the time when the ignition switch of the vehicle Ve was turned on for the current travel to the present time.

Figure 19:
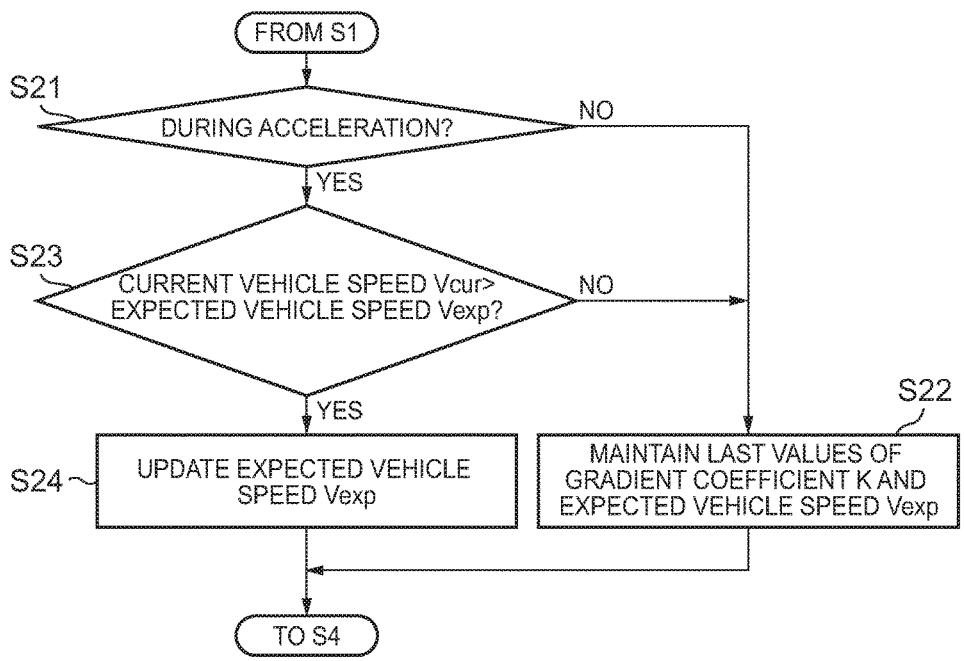
FIG. 19 is a flowchart useful for explaining another example of driving force control performed by the driving force control system for the vehicle of the invention.

In the flowchart of FIG. 19, a control example in which the highest vehicle speed reached during the past acceleration traveling is set as the "expected vehicle speed" as described above is illustrated. In the basic control illustrated in the above-described flowchart of FIG. 2, if a negative decision (NO) is made in step S1, the respective last values of the expected vehicle speed Vexp and the gradient coefficient K are maintained in step S3. On the other hand, under driving force control of this control example, the controller 8 may perform control illustrated in the flowchart of FIG. 19, instead of executing control of step S3 in the flowchart of FIG. 2.

For example, if a negative decision (NO) is made in step S1 in the basic control illustrated in the flowchart of FIG. 2, the controller 8 proceeds to step S21 in the flowchart of FIG. 19. In step S21, it is determined whether the vehicle Ve is traveling while being accelerated. If the vehicle Ve is not being accelerated, and a negative decision (NO) is made in step S21, the controller 8 proceeds to step S22.

In step S22, the respective last values of the expected vehicle speed Vexp and the gradient coefficient K are maintained. This control content is similar to that of step S3 in the flowchart of FIG. 2 as described above. Namely, if it is determined in step S1 that acceleration traveling of the vehicle Ve has not ended, or acceleration traveling has not been performed since start of the control, the last values of the expected vehicle speed Vexp and the gradient coefficient K are the expected vehicle speed Vexp and the gradient coefficient K stored when the ignition switch was turned on for current travel.

Accordingly, if the controller 8 is configured to clear the expected vehicle speed Vexp and the gradient coefficient K when the ignition switch is turned off, the respective initial values of the expected vehicle speed Vexp and the gradient coefficient K read and stored when the ignition switch was turned on for current travel are maintained in step S22. If the controller 8 is configured to store the expected vehicle speed Vexp and the gradient coefficient K at the time when the ignition switch is turned off, the expected vehicle speed Vexp and the gradient coefficient K stored when the ignition switch was turned off last time continue to be maintained.

If the last values of the expected vehicle speed Vexp and the gradient coefficient K are maintained in step S22, as described above, the controller 8 proceeds to step S4 in the flowchart of FIG. 2, and performs control similar to the content as described above. If an affirmative decision (YES) is made in step S21, the controller 8 proceeds to step S23.

In step S23, it is determined whether the current vehicle speed Vcur is higher than the currently set expected vehicle speed Vexp. If the current vehicle speed Vcur is equal to or lower than the expected vehicle speed Vexp, and a negative decision (NO) is made in step S23, the controller 8 proceeds to the above-described step S22, and performs the same control as that as described above.

On the other hand, if the current vehicle speed Vcur is higher than the expected vehicle speed Vexp, and an affirmative decision (YES) is made in step S23, the controller 8 proceeds to step S24. In step S24, the expected vehicle speed Vexp is updated. In this case, since the current vehicle speed Vcur becomes higher than the expected vehicle speed Vexp that was the highest vehicle speed in the past acceleration traveling, the current vehicle speed Vcur becomes the new highest vehicle speed. Accordingly, the new highest vehicle speed is set as the latest expected vehicle speed Vexp. In step S24, the gradient coefficient K is kept at the last value, as in step S22 as described above, for example. As described above, in step S24, the controller 8 updates the expected vehicle speed Vexp, without directly using the correlation or line of correlation between the vehicle speed and the acceleration in traveling data obtained during acceleration traveling. Therefore, the gradient coefficient K as the slope or gradient of the correlation line is kept at the last value, without being updated in step S24.

Once the expected vehicle speed Vexp is updated in step S24, in the manner as described above, the controller 8 proceeds to step S4 in the flowchart of FIG. 2, and performs control according to the content as described above, as in the case where the respective last values of the expected vehicle speed Vexp and the gradient coefficient K are maintained in the above step S22.

In the control illustrated in the flowchart of FIG. 19, when the controller 8 updates the "expected vehicle speed", it can easily obtain the "expected vehicle speed", without performing particularly complicated computations. Therefore, the load of the controller 8 can be reduced. Also, since the chance of updating the "expected vehicle speed" is also provided during acceleration traveling, the frequency of updating of the "expected vehicle speed" is increased, and the estimation accuracy can be improved.

In the basic control illustrated in the flowchart of FIG. 2 as described above, if acceleration traveling of the vehicle Ve ends, and an affirmative decision (YES) is made in step S1, the expected vehicle speed Vexp and the gradient coefficient K are updated in step S2, based on traveling data of the vehicle Ve stored during the last acceleration traveling. On the other hand, under driving force control performed by the controller 8, it may perform control illustrated in the flow chart of FIG. 20 as described below, instead of performing the control of step S2 in the flowchart of FIG. 2 as described above. Namely, under the driving force control performed by the controller 8, the "expected vehicle speed" may be obtained according to a control example illustrated in the flowchart of FIG. 20.

Figure 20:
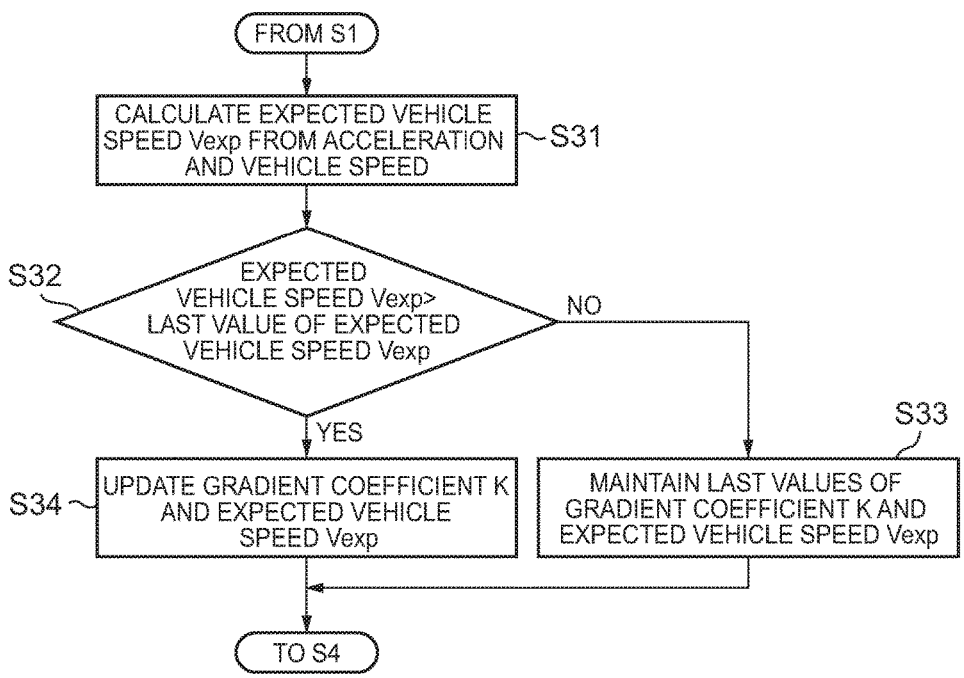
FIG. 20 is a flowchart useful for explaining a further example of driving force control performed by the driving force control system for the vehicle of the invention.

If acceleration traveling of the vehicle Ve ends, and an affirmative decision (YES) is made in step S1 in the basic control illustrated in the flowchart of FIG. 2, the controller 8 proceeds to step S31 in the flowchart of FIG. 20. In step S31, the expected vehicle speed Vexp and the gradient coefficient K are calculated. In the same manner as in step S2 of the flowchart of FIG. 2 as described above, the expected vehicle speed Vexp and the gradient coefficient K are calculated and set in step S31, based on traveling data (the vehicle speed at the start of acceleration, the maximum acceleration during acceleration traveling, etc.) of the vehicle Ve stored during acceleration traveling, the end of which has been determined in step S1.

As the expected vehicle speed Vexp calculated in step S31, the average value of the expected vehicle speeds Vexp set during re-acceleration traveling performed a plurality of times in the past may be used. For example, the average value of the expected speeds Vexp of several re-acceleration travels including the latest one is calculated, and the average value is set as the latest expected speed Vexp in step S31.

Once the expected vehicle speed Vexp is set in step S31, it is determined whether the expected vehicle speed Vexp thus set is higher than the last value of the expected vehicle speed Vexp (step S32). The last value of the expected vehicle speed Vexp is the latest expected vehicle speed Vexp updated in the last cycle of the routine. If the expected vehicle speed Vexp set in step S31 is equal to or lower than the last value of the expected vehicle speed Vexp, and a negative decision (NO) is made in step S32, the controller 8 proceeds to step S33.

In step S33, the respective last values of the expected vehicle speed Vexp and the gradient coefficient K are maintained. This control content is similar to that of step S3 in the flowchart of FIG. 2, and that of step S22 in the flowchart of FIG. 19. In this case, the vehicle Ve is in a condition where acceleration traveling of the vehicle Ve once ended. Therefore, the last values of the expected vehicle speed Vexp and the gradient coefficient K in this case are the expected vehicle speed Vexp and the gradient coefficient K calculated and stored when the previous acceleration traveling ended.

On the other hand, if the expected vehicle speed Vexp set in the above step S31 is higher than the last value of the expected vehicle speed Vexp, and an affirmative decision (YES) is made in step S32, the controller 8 proceeds to step S34. In step S34, the expected vehicle speed Vexp and the gradient coefficient K are updated. Namely, the expected vehicle speed Vexp and the gradient coefficient K newly calculated and set in step S31 of this cycle are set as the latest expected vehicle speed Vexp and gradient coefficient K.

Once the expected vehicle speed Vexp and the gradient coefficient K are updated in step S34, as described above, the controller 8 proceeds to step S4 in the flowchart of FIG. 2, as in the case where the last values of the expected vehicle speed Vexp and gradient coefficient K are maintained in the above step S33, and performs control similar to the above-described content. Namely, the re-acceleration-time acceleration Gexp is calculated, based on the last values of the expected vehicle speed Vexp and gradient coefficient K maintained in step S33, or the latest expected vehicle speed Vexp and gradient coefficient K resulting from updating in step S34.

Like the above-described expected vehicle speed Vexp, the average value of the re-acceleration-time accelerations Gexp set during re-acceleration travels performed a plurality of time in the past may be used as the re-acceleration-time acceleration Gexp calculated in step S4. For example, the average value of the re-acceleration-time accelerations Gexp of several re-acceleration travels including the latest one is calculated, and the average value is set as the latest re-acceleration-time acceleration Gexp.

In the control illustrated in the flowchart of FIG. 20, the expected vehicle speed Vexp updated at least twice is set after acceleration traveling ends, based on the latest expected vehicle speed Vexp and the expected vehicle speed Vexp updated in the last cycle. In another example, the expected vehicle speed Vexp is set based on the average value of the expected vehicle speeds Vexp obtained during re-acceleration travels performed a plurality of times in the past. Then, the re-acceleration-time acceleration Gexp is set based on the expected vehicle speed Vexp set in this manner. The re-acceleration-time acceleration Gexp may also be set, based on the average value of the re-acceleration-time accelerations Gexp obtained during re-acceleration travels performed a plurality of times in the past. Therefore, according to the control illustrated in the flowchart of FIG. 20, an influence of errors in traveling data used for calculating the "expected vehicle speed" can be suppressed or reduced, and the accuracy in estimation of the "expected vehicle speed" and the "re-acceleration-time acceleration" can be improved.

In the above-described embodiment, the "expected vehicle speed" is obtained from the correlation line as shown in FIG. 4, or the control map as shown in FIG. 5, for example. The correlation line shown in FIG. 4 and the control map shown in FIG. 5 are set based on traveling data during the past acceleration traveling. If the past traveling data used in this case is simply accumulated, the amount of data becomes enormously large. Also, even in the case where the traveling environment or the driving tendency changes, traveling data obtained before the change is used if the past traveling data is excessively emphasized; as a result, the accuracy in estimation of the "expected vehicle speed" and the "re-acceleration-time acceleration" may be reduced. Thus, under driving force control by the controller 8, weighting is performed on traveling data used for obtaining the "expected vehicle speed".

The weighting of the traveling data as described above is implemented by multiplying the past traveling data by a given weighting coefficient. In another example, the weighting is implemented by selecting certain traveling data from the entire history of traveling data, and using the selected data for calculation of the "expected vehicle speed". For example, weighting can be performed on traveling data, by multiplying the past traveling data used for setting the correlation line shown in FIG. 4 or the control map shown in FIG. 5, by a weighting coefficient w (w<1). In another example, the correlation line shown in FIG. 4 is set, using only the most recent traveling data of a given number of travels counted back from the latest one, so that weighting of the traveling data can be performed.

Figure 21:
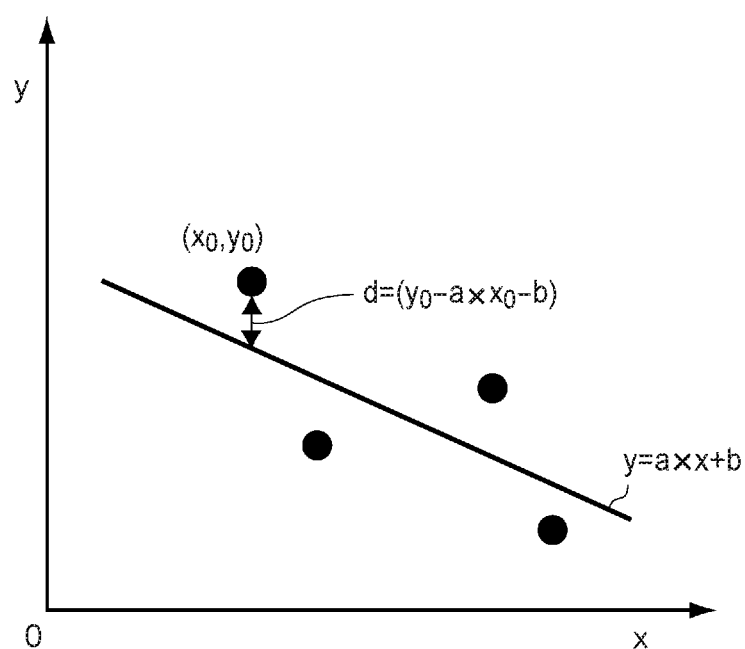
FIG. 21 is a view useful for explaining a method of calculating an approximate line of traveling data, in connection with control for weighting traveling data so as to obtain the "expected vehicle speed" and the "re-acceleration-time acceleration"

For example, as indicated in the graph of FIG. 21, where a point at which given traveling data is plotted on a graph is point $(x_0, y_0)$, and an approximate line obtained from the history of traveling data is "$y = a \times x + b$", an error d of point $(x_0, y_0)$ is expressed as $d = (y_0 - a \times x_0 - b)$. A squared error $(w) \times d^2$ obtained in view of the weighting coefficient w for weighting is expressed as $(w) \times d^2 = (w) \times (y_0 - a \times x_0 - b)^2$. Accordingly, the approximate line "$y = a \times x + b$" can be obtained by calculating coefficient a and coefficient b which minimize the squared error $(w) \times d^2$. The coefficient a and coefficient b which minimize the squared error $(w) \times d^2$ are calculated according to recurrence formulae indicated by the following equations (1) and (2).

$$a = \frac{\sum (w)^{n+1-k} \sum (w)^{n+1-k} x_k y_k - \sum (w)^{n+1-k} y_k \sum (w)^{n+1-k} x_k}{\sum (w)^{n+1-k} \sum (w)^{n+1-k} x_k^2 - \left(\sum (w)^{n+1-k} x_k\right)^2} \quad (1)$$

-continued $$b = \frac{\sum(w)^{n+1-k}x_k^2 \sum(w)^{n+1-k}y_k - \sum(w)^{n+1-k}x_k y_k \sum(w)^{n+1-k}x_k}{\sum(w)^{n+1-k} \sum(w)^{n+1-k}x_k^2 - (\sum(w)^{n+1-k}x_k)^2} \quad (2)$$

In the above equations (1) and (2), where the term of the sum of $x^2$ is denoted as $A_n$, $A_{n-1}$ and $A_n$ are expressed by recurrence formulae like the following equations (3) and (4).

$$A_{n-1} = \sum_{k=1}^{n-1}(w)(n-1)+1-k_{x_k^2} \quad (3)$$

$$A_n = \sum_{k=1}^{n}(w)n+1-k_{x_k^2} \quad (4)$$
$$= (w)(A_{n-1} + x_n^2)$$

Regarding the term of the sum of $x^2$ in the recurrence formulae of the above-indicated equations (1) and (2), the current value ($A_n$) of the sum can be obtained by adding the current value ($x_n^2$) of $x^2$ to the last value ($A_{n-1}$) of the sum, and multiplying the result of the addition by the weighting coefficient w. This also applies to the terms of other sums in the recurrence formulae of the above-indicated equations (1) and (2). Therefore, for the coefficient a and the coefficient b expressed by the above equations (1) and (2), the current values of the sums can be obtained if the last values of the sums are known. Accordingly, even if the history of the past traveling data is not entirely stored, the approximate line "y=a×x+b" weighted by the weighting coefficient w can be obtained from the last values and current values of the sums if the last values of the sums are stored.

Figure 22:
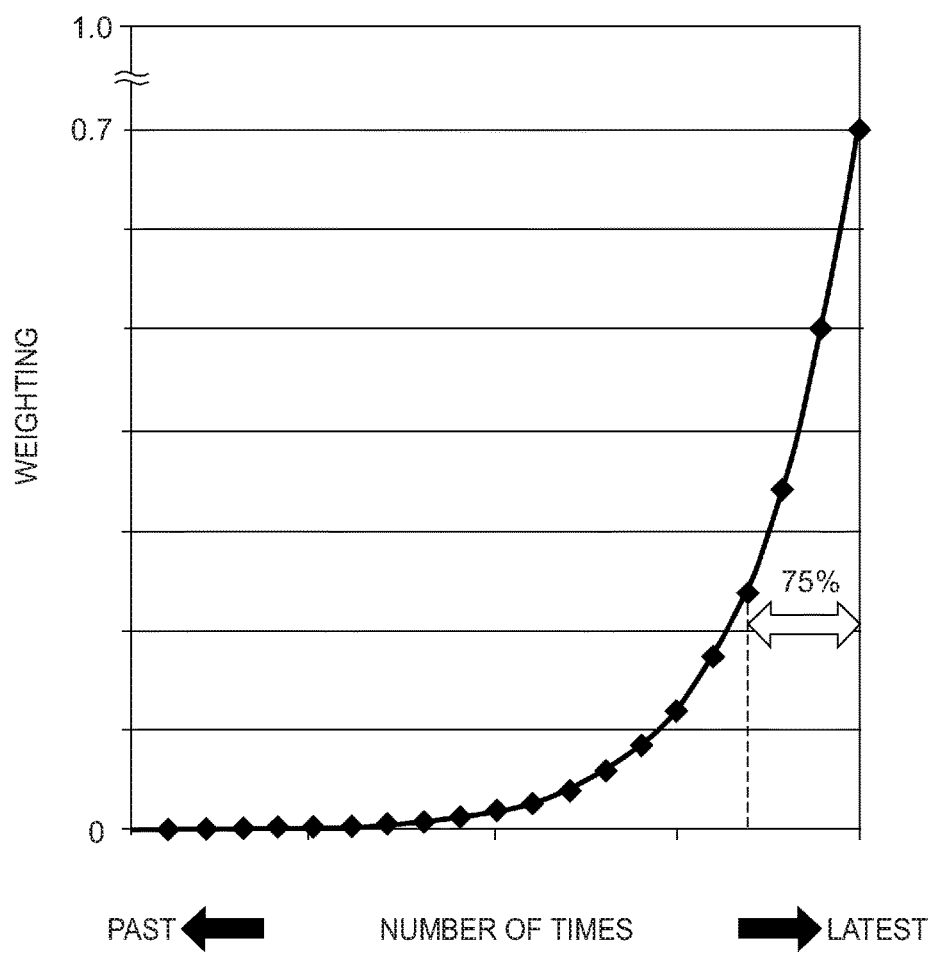
FIG. 22 is a view useful for explaining the effect of weighting of the traveling data.

When weighting of traveling data is performed with the weighting coefficient w set to 0.7 (w=0.7), for example, the latest data from four acceleration travels amounts to about 75% of the entire amount of information, as indicated in FIG. 22. Thus, with the above-described weighting thus performed, the degree of importance of the latest data can be increased, and past data that is of reduced importance may be cleared, for example. If the weighting coefficient w is set to a fixed value, changes per travel in the above-indicated recurrence formulae become constant; as a result, the approximate line "y=a×x+b" can be easily obtained through calculation of the above-indicated recurrence formulae. Accordingly, by performing weighting on the traveling data as described above, it is possible to reduce the load of the memory that stores data and the load during computations, while assuring certain accuracy in estimation of the "expected vehicle speed" and the "re-acceleration-time acceleration".

Figure 23:
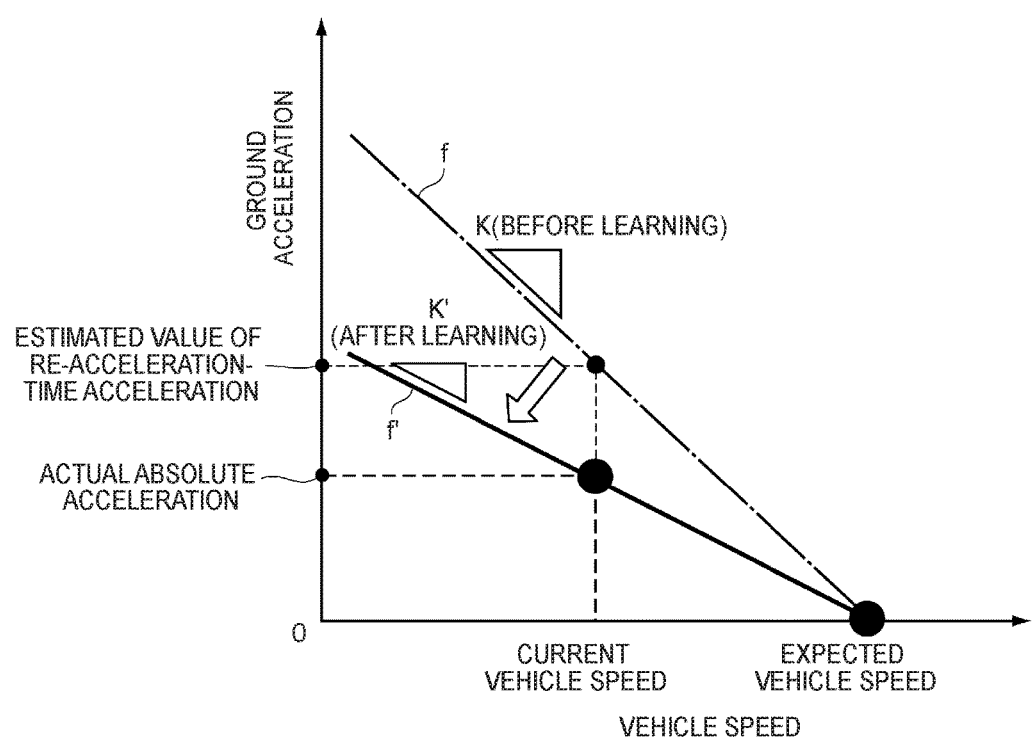
FIG. 23 is a view useful for explaining an example in which a coefficient (slope) that specifies a correlation line for obtaining the "expected vehicle speed" and the "re-acceleration-time acceleration" is controlled by learning, in the driving force control of the invention.

In the control map shown in FIG. 5 as described above, the straight line f used for estimating the "re-acceleration-time acceleration" from the "expected vehicle speed" is specified by the gradient coefficient K. Thus, the accuracy in estimation of the "re-acceleration-time acceleration" can be improved by updating the gradient coefficient K by learning. For example, as shown in FIG. 23, when the actual ground acceleration of the vehicle Ve is smaller than the "re-acceleration-time acceleration" estimated from the straight line f of the gradient coefficient K, the "expected vehicle speed" is kept constant, and the gradient coefficient K is learned so that the actual ground acceleration becomes equal to the "re-acceleration-time acceleration". In the example shown in FIG. 23, the gradient coefficient K is changed by learning to a gradient coefficient K' that is smaller than K. When the actual ground acceleration is larger than the "re-acceleration-time acceleration" estimated from the straight line f of the gradient coefficient K, the gradient coefficient K is changed to a larger value by learning. While learning of the gradient coefficient K as described above may be performed based on data of one past travel, the learned value of the gradient coefficient K may be obtained with reference to data of several travels, so that the "re-acceleration-time acceleration" can be estimated with improved accuracy.

Figure 24:
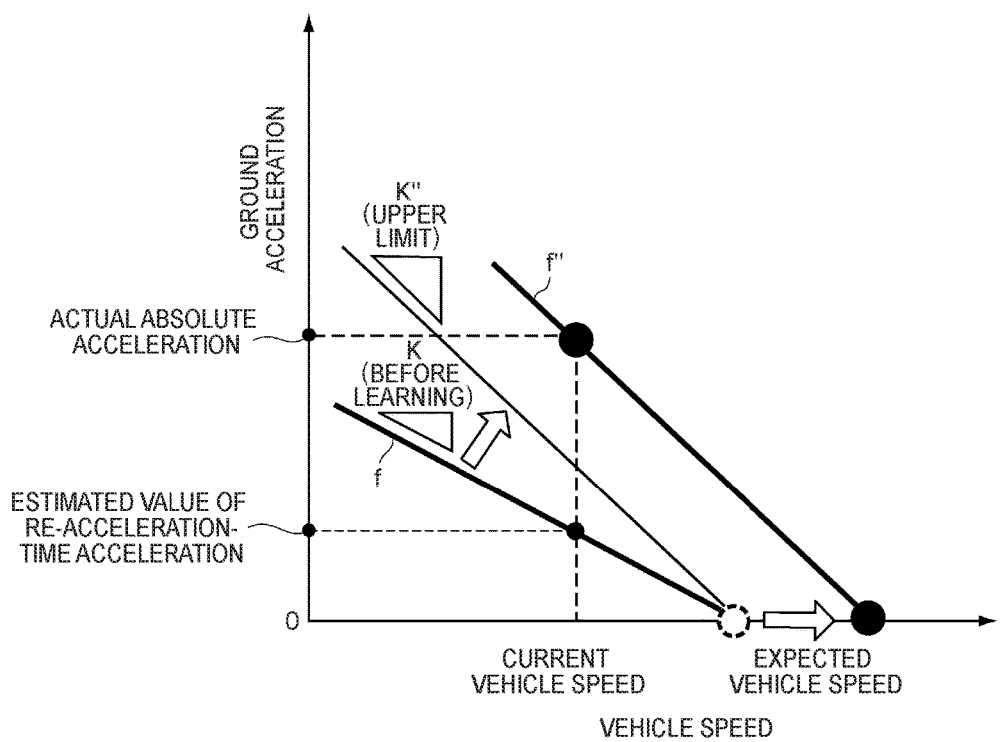
FIG. 24 is a view useful for explaining another example in which a coefficient (slope) that specifies a correlation line for obtaining the "expected vehicle speed" and the "re-acceleration-time acceleration" is controlled by learning, in the driving force control of the invention.

In the case where the gradient coefficient K is learned as in the above-described embodiment shown in FIG. 23, if the gradient coefficient K is excessively large, an estimated value of the "re-acceleration-time acceleration" becomes excessively large when there is a large difference between the "expected vehicle speed" and the "current vehicle speed". As a result, the lower gear position (or larger speed ratio) than that expected by the driver is selected, and the driver may feel strange or uncomfortable. Thus, when the gradient coefficient K is learned as described above, an upper limit may be provided for the learned value. For example, as shown in FIG. 24, when the actual ground acceleration of the vehicle Ve is larger than the "re-acceleration-time acceleration" estimated from the straight line f of the gradient coefficient K, the gradient coefficient K is initially increased while the "expected vehicle speed" is kept constant, so that the actual ground acceleration becomes equal to the "re-acceleration-time acceleration". However, in this case, a predetermined gradient coefficient K" is set as the upper limit. If the actual ground acceleration does not coincide with the estimated "re-acceleration-time acceleration" even if the gradient coefficient K is increased up to the upper-limit gradient coefficient K", the "expected vehicle speed" is changed to a larger value, and a straight line f" is set so that the actual ground acceleration becomes equal to the "re-acceleration-time acceleration".

Thus, by performing learning of the gradient coefficient K with the upper limit thus set, it is possible to estimate the "re-acceleration-time acceleration" with high accuracy, while preventing the estimate value of the "re-acceleration-time acceleration" from being excessively large.

Figure 25:
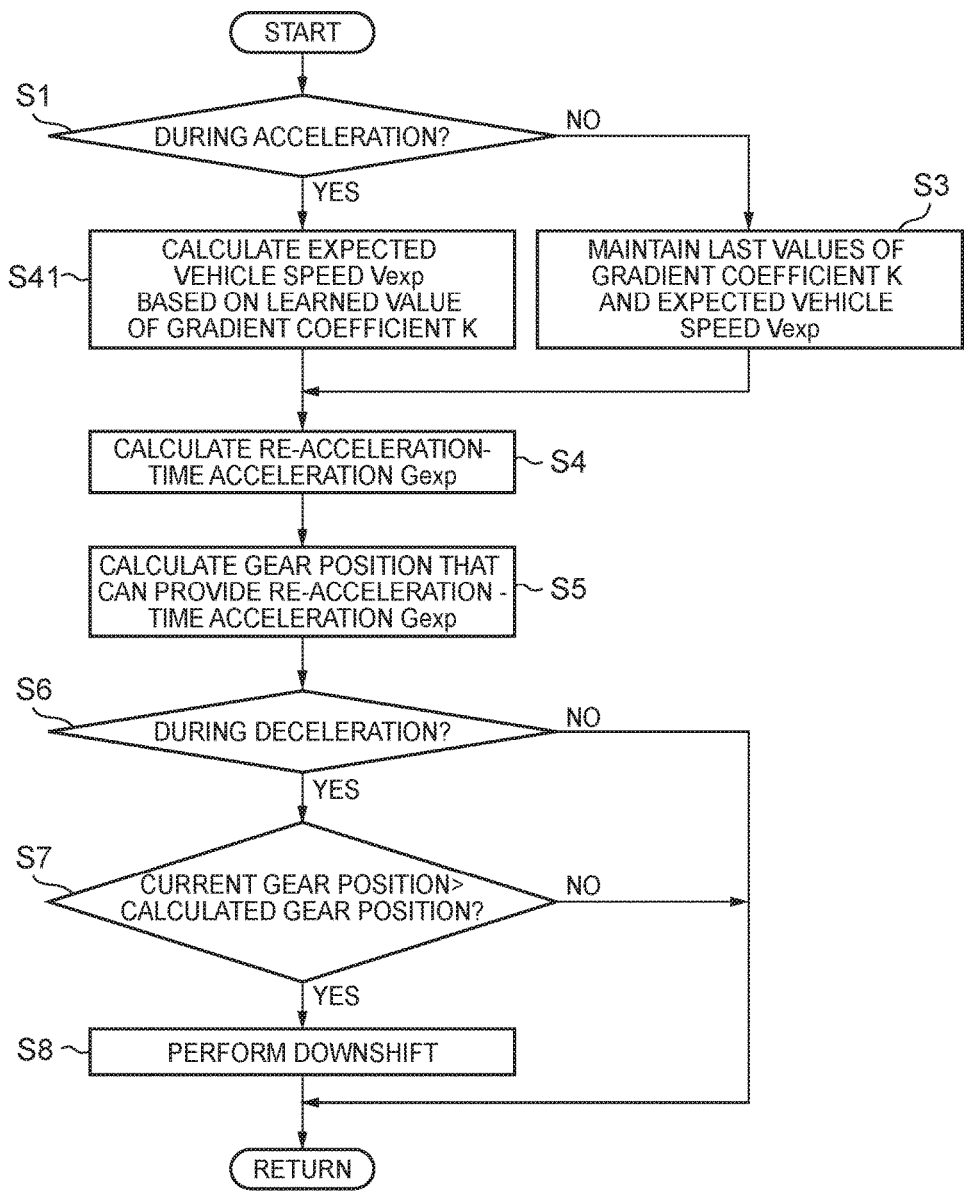
FIG. 25 is a flowchart useful for explaining a further example of driving force control performed by the driving force control system for the vehicle of the invention.

The control involving learning of the gradient coefficient K as described above is performed as illustrated in the flowchart of FIG. 25, for example. The control illustrated in the flowchart of FIG. 25 is provided by replacing step S2 in the basic control illustrated in the flowchart of FIG. 2, by step S41 in the flowchart of FIG. 25. Namely, in the above-described step S2, the expected vehicle speed Vexp and the gradient coefficient K are updated, based on traveling data stored during acceleration traveling, whereas, in step S41, learning of the gradient coefficient K is implemented as described above, and the expected vehicle speed Vexp is obtained based on the learned value of the gradient coefficient K.

Once the expected vehicle speed Vexp is updated based on the learned value of the gradient coefficient K as described above, the controller 8 proceeds to step S4. Then, in step S4 and subsequent steps, control similar to the content as described above is performed.

What is claimed is:
1. A driving force control system for a vehicle, the vehicle including an engine, drive wheels, and an automatic transmission that transmits torque between the engine and the drive wheels, the driving force control system comprising:

a controller configured to:
(i) control a driving force of the vehicle, based on a vehicle speed and an accelerator operation amount of the vehicle;
(ii) store an acceleration characteristic that defines a relationship between re-acceleration-time acceleration and the vehicle speed, the re-acceleration-time acceleration being as a control index used when the vehicle travels while being re-accelerated after deceleration traveling;
(iii) obtain the re-acceleration-time acceleration corresponding to a current vehicle speed, based on traveling data of the vehicle obtained before the deceleration traveling, and the stored acceleration characteristic;
(iv) set a speed change ratio of the automatic transmission which can realize the re-acceleration-time acceleration, based on the control index of the obtained re-acceleration-time acceleration, before the re-acceleration traveling starts;
(v) estimate an expected vehicle speed desired by a driver to be achieved during the re-acceleration traveling, based on the traveling data obtained during acceleration traveling before the deceleration traveling;
(vi) obtain the re-acceleration-time acceleration corresponding to the current vehicle speed, based on the current vehicle speed and the estimated expected vehicle speed;
(vii) store a plurality of acceleration characteristic lines on which the re-acceleration-time acceleration is determined according to the vehicle speed;
(viii) select one of the acceleration characteristic lines based on the expected vehicle speed; and
(iv) obtain the re-acceleration-time acceleration corresponding to the current vehicle speed, based on the current vehicle speed, the expected vehicle speed, and the selected one of the acceleration characteristic lines.

2. The driving force control system according to claim 1, wherein the controller is configured to:
(i) store a vehicle speed and an acceleration when the re-acceleration traveling is started, and
(ii) update the acceleration characteristic line.

3. The driving force control system according to claim 1, wherein the controller is configured to:
(i) obtain the re-acceleration-time acceleration, by using an average value of the re-acceleration-time acceleration or an average value of the expected vehicle speed in re-acceleration travels performed a plurality of times in the past; and
(ii) set the speed ratio of the automatic transmission that can realize the obtained re-acceleration-time acceleration.

4. The driving force control system according to claim 1, wherein the controller is configured to set a highest vehicle speed recorded by the vehicle from a point in time when the expected vehicle speed is not set, before the deceleration traveling is started, as the expected vehicle speed.

* * * * *